United States Patent
Johnson et al.

(10) Patent No.: US 12,333,545 B2
(45) Date of Patent: Jun. 17, 2025

(54) PROBABILISTIC ANOMALY DETECTION IN STREAMING DEVICE DATA

(71) Applicant: PAYPAL, INC., San Jose, CA (US)

(72) Inventors: Raoul Johnson, Scottsdale, AZ (US); Jakub Burgis, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 1091 days.

(21) Appl. No.: 17/070,682

(22) Filed: Oct. 14, 2020

(65) Prior Publication Data

US 2022/0114593 A1    Apr. 14, 2022

(51) Int. Cl.
*G06Q 20/40* (2012.01)
*G06F 18/214* (2023.01)
*G06N 7/01* (2023.01)
*G06N 20/20* (2019.01)
*H04L 67/50* (2022.01)

(52) U.S. Cl.
CPC ....... *G06Q 20/4016* (2013.01); *G06F 18/214* (2023.01); *G06N 7/01* (2023.01); *G06N 20/20* (2019.01); *H04L 67/535* (2022.05)

(58) Field of Classification Search
CPC .............................. G06Q 20/40; G06F 16/951
See application file for complete search history.

(56) References Cited

U.S. PATENT DOCUMENTS

| | | |
|---|---|---|
| 2016/0226872 A1 | 8/2016 | Oberheide et al. |
| 2019/0098037 A1 | 3/2019 | Shenoy, Jr. et al. |
| 2019/0297096 A1 | 9/2019 | Ahmed et al. |
| 2020/0151222 A1* | 5/2020 | Mannar .................. G06F 16/951 |
| 2020/0153855 A1 | 5/2020 | Kirti et al. |
| 2021/0097163 A1* | 4/2021 | Efremov ............. G06F 21/6245 |

OTHER PUBLICATIONS

International Search Report and Written Opinion mailed Jan. 24, 2022 in international application No. PCT/US2021/055107, 10 pages.

* cited by examiner

*Primary Examiner* — Ojo O Oyebisi
(74) *Attorney, Agent, or Firm* — Haynes and Boone, LLP

(57) ABSTRACT

There are provided systems and methods for a machine learning model for probabilistic anomaly detection in streaming device data. A server obtains a plurality of features associated with a user interaction between a user device and the server. The server selects a combination of features from the plurality of features, where the combination of features comprises features having a variance of expected values that exceeds a threshold variance. The server selects a prediction engine to process the combination of features with a corresponding non-parametric statistical model of a plurality of non-parametric statistical models and to generate a prediction indicating a likelihood that the combination of features represents an anomaly corresponding to fraudulent activity. The server issues a remedial action to the user device through an application programming interface with a remedial action engine based on the prediction for applying the remedial action on the user interaction.

20 Claims, 11 Drawing Sheets

PROBABILISTIC ANOMALY DETECTION IN STREAMING DEVICE DATA

TECHNICAL FIELD

The present application generally relates to machine learning models trained for probabilistic anomaly detection and more particularly to an engine having a machine learning model trained to detect probabilistic anomalies in streaming device data, according to various implementations.

BACKGROUND

Electronic service providers may provide an online marketplace environment for users, which may be used to buy and sell goods with other entities. Some of these services may be used maliciously by fraudulent users, such as overtaking a merchant account and taking control of payments made for goods sold, which poses a significant risk to these service providers. Since the service providers may process thousands (or more) transactions daily, it may be difficult to review without a large review and compliance team.

Moreover, tactics in performing prohibited transactions electronically are ever-evolving and becoming more sophisticated. Electronic service providers need to keep pace with the fraudulent users in providing security measures, such as accurately evaluating risk (e.g., detecting prohibited transactions) in real-time. In this regard, computer models are often utilized to assist in evaluating risks of electronic transactions.

Figure 1:
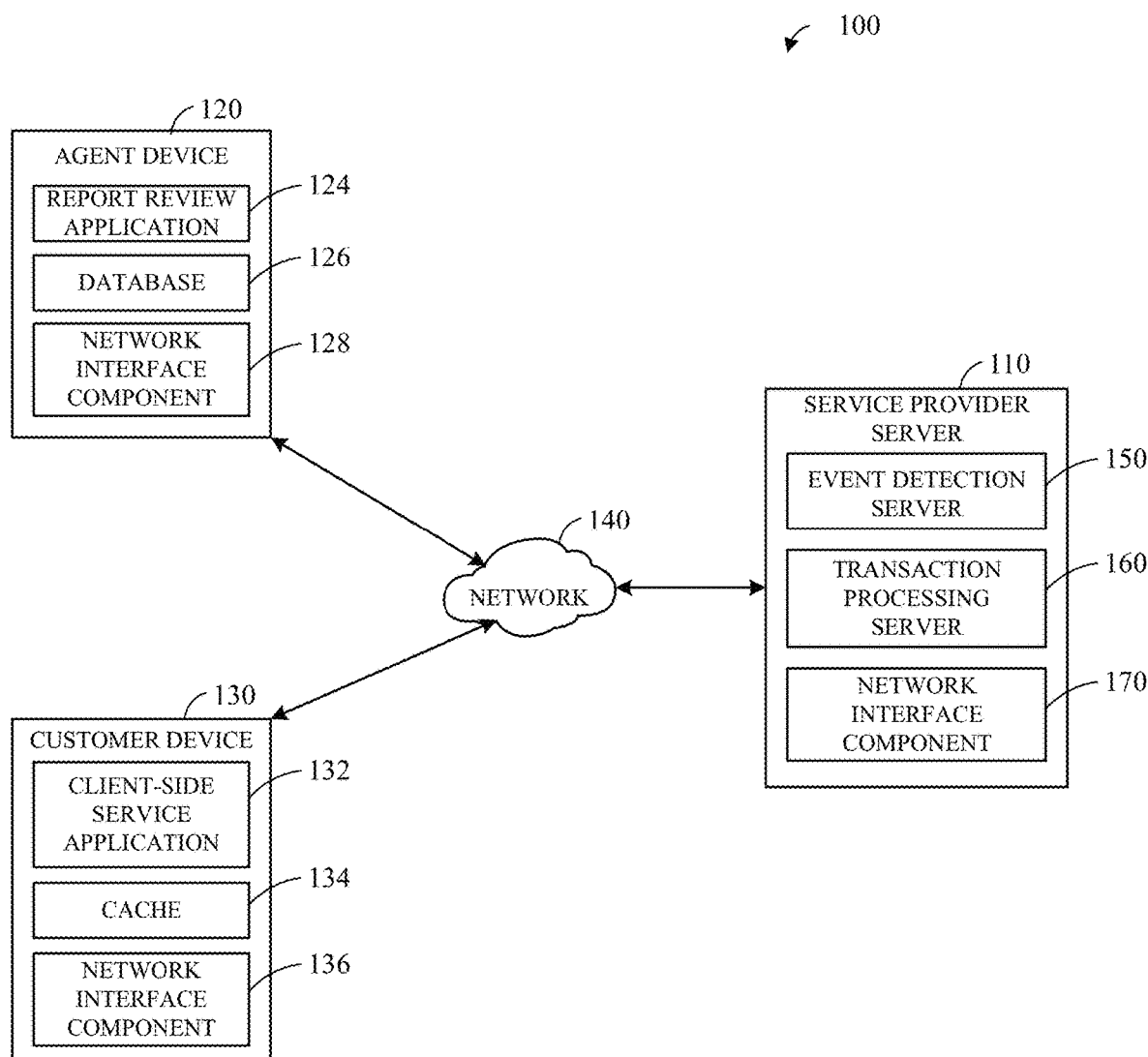
FIG. 1 illustrates a block diagram of a networked system suitable for implementing the processes described herein, according to an implementation of the present disclosure.

Implementations of the present disclosure and their advantages are best understood by referring to the detailed description that follows. It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

An online service provider that provides electronic services, such as electronic content access, electronic transactions, etc. may offer numerous avenues for users to interact with the online service provider. For example, users may interact with the online service provider by accessing a website or a mobile application associated with the online service provider. In another example, the user may communicate with the online service provider by calling a hotline associated with the online service provider, sending emails to a designated email address associated with the online service provider, and/or chatting with an agent (or a chatbot) of the online service provider via a chat application. These various avenues provide convenient access to the online service provider, but also offer opportunities for malicious users to perform fraudulent access of data and/or service of the online service provider. Thus, various aspects of the disclosure, as discussed in detail below, provide frameworks and platforms for efficiently detecting malicious activities during the interactions with the online service provider and performing actions to reduce loses caused by the malicious activities.

Probabilistic Anomaly Detection in Streaming Device Data

It is often difficult to identify unusual data when viewing steaming device data (e.g., reviewing logs attempting to find fraudulent information). The streaming device data may be associated with device attributes associated with devices that have attempted connection with an online service provider (e.g., an online server). The devices may attempt to access electronic services offered by the online service provider (e.g., logging in to a user account with the online service provider, accessing data from the online service provider, initiating an electronic transaction such as an electronic payment transaction through a user account with the online service provider, etc.) When reviewing the data manually, it is not easy or intuitive to identity anomalies. For example, when looking through events that contain different descriptors for mobile devices, it is difficult to determine which log entries represent prohibited transactions (e.g., fraudulent/malicious/falsified data).

Thus, according to an aspect of the disclosure, an anomaly detection system provides an anomaly detection framework that identifies anomalies during interactions of the online service provider with a user device in real time based on device attributes associated with the user device. In some embodiments, the anomaly detection system may leverage the likelihood of a given combination of device attributes in a dataset. Upon detecting an anomaly during the interactions with the user device, the anomaly detection system may automatically take one or more actions, including but not limited to, alerting an agent, providing a differed experience for a user of the user device, re-securing a user account that is being accessed by the user device, etc. For example, the anomaly detection system may provide additional restrictions to data and/or services that can be accessed by the user device.

Devices of the same type (e.g., same manufacturers, same models, etc.) may share similar qualities (e.g., attributes). Devices of a particular type can look similar to each other when viewed via a log file. This similarity also extends to software platforms. For example, if a smartphone of a particular brand and a particular model version (e.g., Apple® iPhone 8) has a specific screen height and width, then every smartphone of the same model version that connects to a service provider system should have features that align with others using that same model version. If, however, the anomaly detection system detects that the user device attempted to connect to the service provider system (e.g., to access the website of the service provider system, to access a user account with the service provider system, to perform an electronic transaction through a user account with the service provider system, etc.) has features that differed greatly from those of its same type, the anomaly detection system may determine that an anomaly is present and should be investigated. By leveraging a statistical analysis technique with machine learning, such as a probability density function (PDF), among others, the anomaly detection system may isolate anomalies by holding some device attribute values constant and generating machine learning-trained statistical models around the remaining device attributes. The anomaly detection system may identify outliers and anomalies in real time over streaming device data, and automatically take a remedial action based on desired outcomes.

Existing approaches in anomaly detection can acquire a set of data, plot that data, and attempt to visualize what is different among the rendered data. In contrast, the anomaly detection system of some embodiments leverages machine learning to identify fraudulent and/or suspicious devices attempting to connect with the service provider system in real time via their device attributes in an effort to automatically invoke a prohibited transaction. The anomaly detection framework disclosed herein is more cost efficient than existing anomaly detection systems and flexible enough to be useful for service providers and/or users attempting to defend systems from bad actors.

In a first use case example, a research individual is attempting to identify malicious activity on an online payment processing system. The research individual generates logs that cover a specified time-period of suspected prohibited activity. The log contains thousands, if not millions, of lines of data. The research individual first tries to plot features to find correlations and analyze the data. The research individual plots histograms and attempts clustering techniques, but to no avail. The research individual then leverages the anomaly detection system to isolate device features and generate multi-dimensional probability maps of the remaining device features. These probability maps help to identify outliers within the data. The research individual now has a much smaller subset of data from which to identify the malicious activity within the system.

In a second use case example, devices of a certain type can have certain features that are static (e.g. their model number). As such, the anomaly detection system may use that information to hold that value constant and generate a dynamic density map of interactions with the remaining device features by leveraging a subset of last-known instances of that device. Based on the density map, the subject technology can identify and detect which device-to-system connections have a minimal (or low probability) of occurrence given the other constant values. Those connections can then be acted upon with the following outcomes: (1) the connection attempt can be automatically directed to a secondary flow for further analysis, (2) the connection attempt can be stepped up with additional user authentication prompts, (3) an agent can be alerted to an anomalous connection, and/or (4) additionally security checks can be automatically performed to validate the authenticity of the connection (e.g., vendor identifier (VID) lookup, account review, etc.).

Analysis Platform for Actionable Insight into User Interaction Data

The online service provider that provides electronic transaction services may receive a large amount of communication attempts from legitimate users and malicious users, which include emails that are transmitted to a dedicated e-mail address associated with the online service provider, phone calls received via a support hotline associated with the online service provider, chat sessions initiated via a website of the online service provider, etc. These e-mails, calls, and chat interactions with the online service provider can be collectively referred to as customer inputs. Many of the customer inputs may be from legitimate users who are requesting help for resolving issues related to their user accounts (e.g., disputing a transaction, issues with logging into an account, etc.). However, at least some of the customer inputs is not related to legitimate users' concerns (e.g., subscriptions, advertisements, etc.), and some may even include malicious content (e.g., malware attachments, phishing emails or phone calls, etc.).

Processing through such a high volume of customer inputs manually is not feasible both in terms of resources and time. Thus, according to another aspect of the disclosure, an analysis system may be configured to automatically classify and analyze customer inputs (e.g., email, phone, chat, etc.) for producing actionable insights related to fraud campaigns, phishing attacks, malware distribution, or product issues.

In some embodiments, the analysis system may classify customer inputs (e.g., customer complaints and/or issues reported by e-mails, voice calls, and/or chat sessions) into respective categories for automated analysis and remedial action. The analysis system may classify a customer input into one or more fraud categories based on matching the customer input to one or more known (or stored) fraud patterns. The analysis system may also identify new fraud campaigns not yet known. In some embodiments, the analysis system may detect common victim patterns in user accounts that have been exposed to fraud. Based on the detected patterns, the analysis system may invoke risk rules to prevent fraudulent activities associated with the user account. For example, the analysis system may detect that a customer input is associated with a phishing scheme. The analysis system may then forward the customer input to a phishing sub-module for analysis and action. In another example, the analysis system may detect whether a customer input (e.g., an email) includes an attachment (e.g., a data file) that is malicious. The analysis system may then generate a signature for the attachment and may block the customer input from being presented in an email inbox.

In some embodiments, upon receiving a customer input, the analysis system may classify the customer input into one of multiple categories. Example categories may include: (1)

fraud complaints, (2) phishing, (3) malware, (4) other, and/or (5) noise. The analysis system may include additional categories for classification to accommodate larger datasets of customer input. For classification, the analysis system may include or use a machine learning model, such as support vector machines (SVMs) or Random forest classifiers that are trained on previously labeled customer input for each category. The labeled dataset can be gathered from customer support agents. For feature extraction, the analysis system may utilize different representations including bag-of-words, term frequency inverse document frequency (TF-IDF), document to vector representation (Doc2Vec) that uses a deep learning approach. The analysis system may extract topics using Latent Dirichlet Allocation (LDA), and select the best performing feature extraction model to extract features from the customer inputs. In some embodiments, the analysis system may also augment the model with information regarding the caller/sender of the customer input. Once a customer input is classified in one of these categories, further action can be taken on each interaction.

When the customer input is classified as a fraud complaint, the analysis system may cluster the customer input with other similar reported fraud activities (e.g., other customer inputs that have been classified as the same category). For example, a user may contact the online service provider to complain about receiving invoices related to renewing a website domain from a domain provider. When the analysis system classifies such a customer input as a fraud complaint, the analysis system may cluster such a customer input with other related complaints over invoices associated with renewing website domains. In some embodiments, since certain complaints may relate to multiple types of frauds, the analysis system may implement a probabilistic clustering technique, such as Gaussian mixture model (GMM). GMM can assign a probability to each fraud complaint based on which cluster is assigned to the fraud complaint. If a complaint does not seem to fall in any one of the existing clusters, a new cluster can be created. Once a cluster reaches a certain number of complaints, a report generation model can be triggered to generate a report. The analysis system may identify specific information from the complaints, such as email addresses of the customers or any transaction details, and derive patterns from the complaints that belong the same cluster such as country of origin of the customers, customer age range, network addresses used for the transaction, transaction amount that was charged, a description of the service if any, and so on. This information can be added to the report with all the insights gathered and forwarded to an agent device for further analysis and action. As such, the analysis system may increase the efficiency of handling customer inputs (e.g., legitimate customer inputs may be forwarded to the right personnel or chatbots to handle), while malicious customer inputs are properly classified and forwarded to different modules for further analysis and actions.

In an example use case, the online service provider may receive user complaints in the form of calls, e-mails, and/or chat regarding invoices sent to them to pay for a web site domain renewal by a web hosting company. With a clustering technique, these complaints can be grouped together based on the content of the e-mail, the amount requested, and the hosting provider. Once a predetermined number of complaints (e.g., exceeding a threshold) is identified, the analysis system may be triggered to generate a report. The analysis system may analyze the grouped customer inputs (e.g., within the same cluster) to derive patterns. For example, the analysis system may determine that a majority of the customers associated with the grouped customer inputs fall in a specified age band (e.g., older than 50 years of age) and are all known to reside in the United States. The invoices are determined to originate from accounts registered in Russia where the hosting provider has no place of business or business presence. The analysis system may determine a risk level based on the derived patterns, and may alert a risk team to investigate the complaints in more detail when the risk exceeds a threshold. In some embodiments, the analysis system may also perform actions such as restricting access to the user accounts associated with the complaints when the risk level exceeds the threshold.

Automated Device Data Retrieval and Analysis Platform

According to another aspect of the disclosure, a browser analysis system of the online service provider may employ anti-fraud defense techniques to generate fingerprints for various types of web applications (e.g., browsers or other web clients) connecting to the online service provider. In some embodiments, upon detecting an attempt by a web application of a user device to connect to the online service provider, the browser analysis system may transmit code to the user device and cause the user device to execute the code. The code, when executed by the web browser, is configured to examine webpage attributes (e.g., document object model (DOM) attributes) and/or values of a webpage being loaded and presented on the user device. The webpage attributes and/or values may enable the browser analysis system to a) track a unique user over time, and b) determine an anomaly, such as whether the web application is providing inaccurate information of its actual identity through malicious manipulation of the web browser attributes and values.

To determine which attributes, behaviors, values, etc., are relevant for detecting anomalies is a time-consuming and daunting task that requires skilled developers to manually examine each individual type of web applications. Since the attributes, behavior, and/or values that are relevant for detecting anomalies for one type of web applications may not be relevant for another type of web applications, the skilled developers may be required to perform this manual examination for each type and each version of web applications, and may have to continue to perform manual examination when a new version of a browser is released. Otherwise, the existing device data can lose effectiveness over time as the web browser changes and evolves.

Devices of the same type (e.g., same manufacturers, same models, etc.) may share similar qualities (e.g., attributes). Devices of a particular type can look similar to each other when viewed via a log file. This similarity also extends to software platforms. For example, if a smartphone of a particular brand and a particular model version (e.g., Apple® iPhone 8) has a specific screen height and width, then every smartphone of the same model version that connects to a service provider system should have features that align with others using that same model version. If, however, the online platform detects that the user device attempted to connect to the service provider system (e.g., to access the website of the service provider system, to access a user account with the service provider system, to perform an electronic transaction through a user account with the service provider system, etc.) has features that differed greatly from those of its same type, the online platform may determine that an anomaly is present and should be investigated.

In some embodiments, the browser analysis system provides in-depth and automatic testing of current and pre-release web applications with the intent of generating a comprehensive database of their behaviors, features, and functionality in order to provide additional capabilities for detection and mitigation of malicious actors using modified or spoofed client devices. The browser analysis system may also allow base lining for statistical modeling of browser traffic and can generate alert notifications of new functionality that can be implemented into anti-fraud defense mechanisms.

Voice Vector Framework for Authenticating User Interactions

Fraudulent calls are often made to customer service agents with the goal of lifting restrictions on an account or performing account takeover using password reset initiated by the customer service agent. Social engineering techniques are often employed where the caller provides enough information to convince the agent to perform the desired action on an account that is not theirs. Additionally, these types of attacks occur on a scale where the same person may be calling for multiple accounts.

As such, in another aspect of the disclosure, a voice authentication system may detect fraudulent calls based on analyzing voice characteristics of the callers. In some embodiments, using various voice analysis techniques disclosed herein, the voice authentication system may authenticate a caller as a legitimate user associated with a user account of the online service provider and also determine if the caller has called before on multiple other user accounts of the online service provider. When the voice authentication system has determined that the caller is suspicious (e.g., that the caller is not a legitimate user associated with the user account and/or that the caller is linked to previous call(s) associated with other user account), the voice authentication system may provide real-time feedback by alerting an automated chat module (e.g., a chatbot) or customer service agents of the online service provider of such suspicious activity. In some embodiments, the voice authentication system may leverage various aspects of speech recognition and voice identification technology as well as intent identification on the incoming customer call. The voice authentication system may provide a framework for a two-stage procedure that first verifies the identity of a caller and second to check if the same caller has previously called with the same intention on a different account not belonging to him or her. This framework can identify fraudsters, generate a voice blacklist, and alert customer service agents in real time to mitigate any security lapse.

In order to facilitate analyses of voice characteristics of incoming callers, the voice authentication system may generate multiple machine learning-based voice models that represent variations of voices associated with different user accounts of the online service provider. In some embodiments, the voice authentication system may generate multiple generic voice models, where each of the generic voice models may correspond to a particular cross-section of demographics. Examples of the demographics may include gender, country of origin (e.g., accent), age, among others. An example cross-section can be a young male (e.g., younger than 30 years old) from France, or an elderly female (e.g., older than 60 years old) from New York. There can be a number of generic voice models generated to represent individual attributes and selected cross-sections that together encompass the widest possible group of individuals. In some embodiments, the voice authentication system may generate the machine learning-based generic voice models based on different combinations of a particular subset of the demographics attributes, such as gender, age, and accent. The machine learning-based voice models may be configured to identify age groups in a binary manner such as old/young, or categorically by dividing the different ages into different age groups.

The voice authentication system may select, for each user account, a particular machine learning-based generic voice model based on voice characteristics of a user of the user account. Thus, the voice authentication system may select, for a user account associated with a female user who is 26 years old from France, a generic voice model corresponding to a female-young-French voice. In another example, the voice authentication system may select, for a user account associated with a male user who is 65 years old from England, a generic voice model corresponding to a male-old-English voice.

The generic voice model can be used by the voice authentication system to generate multiple different voice models specific to each of the user accounts. For example, the voice authentication system may train, for a particular user account, the generic voice model using different audio files associated with the particular user account to generate different voice models corresponding to different call intentions. The audio files associated with the user account may be obtained based on historical calls as previously identified by customer service agents (e.g., verifying that the caller was, in fact, the rightful owner of the user account). In some embodiments, the voice authentication system may identify different audio files associated with a user account corresponding to different call intentions. In general, the online service provider may determine one or more call intentions of the callers based on the type of services provided by the online service provider. Common call intentions may include "password reset," "payment transaction," "payment dispute," or other types of intentions. The voice authentication system may categorize the audio files associated with the user account based on the different call intentions. The voice authentication system may then extract keywords from the audio files that correspond to each of the call intentions. For example, for the call intention of "password reset," the voice authentication system may extract, from the audio files corresponding to the "password reset" call intention, phrases such as "password reset," "resetting my password," "password resetting," etc. These audio files with the extracted keywords can be grouped together for training a "password reset" model for the user account.

The voice authentication system may generate and train a voice model, for the user account and a corresponding call intention, based on the extracted keywords from the audio files using the generic voice model. Thus, the voice authentication system may generate, for each user account based on the corresponding generic voice models, multiple voice models for the different call intentions. Since each of the voice models is trained with the same phrase (or multiple similar phrases), any variation within each of the resulting voice models can be due to audio quality and patterns of speech. Pre-processing can be performed on the audio files (having the extracted keyword) to normalize the variation and eliminate noise. The result can be a set of trained voice models whose variation would be the result of the differences in speech patterns from one group to the other. The machine learning-based voice models can be periodically updated using previously saved and tagged data.

In the first stage of the framework, when the voice authentication system detects an incoming call inquiring about a user account with the online service provider, the voice authentication system may determine whether the caller is associated with the user account based on the generated voice models associated with the user account. The incoming call may include voice data associated with phrases and utterances made by the caller. In some embodiments, the voice authentication system may identify a call intent of the incoming call based on the voice data. For example, the voice authentication system may extract one or more keywords from the voice data, and classify the call as one of the multiple call intentions based on the extracted keywords. In one example, if the voice authentication system detects a phrase that is linked to one of the voice models (e.g., the phrase "resetting my password") in the voice data, the voice authentication system may classify the call as the call intention associated with the voice model (e.g., the "password reset" call intention). The voice authentication system may then select the voice model that corresponds to the extracted keyword(s) to authenticate the caller.

In some embodiments, upon classifying the call as a particular call intention, the voice authentication system may determine whether the caller is a legitimate user of the user account using a voice model associated with the user account and corresponding to the call intention. When comparing the caller's audio sample (e.g., the keyword(s) extracted from the voice data) against the selected voice model, the voice authentication system or the voice model may generate an "accuracy" or "confidence" score. In some embodiments, the voice model may output a value (e.g., a confidence score) indicating how close the audio sample is to a voice of the same phrase generated by the model.

In some embodiments, the voice authentication system and/or the voice models may determine the confidence score based on voice vectors associated with the voice data of the caller. For example, for each voice model generated for the user account, the voice authentication system may generate a signature in the form of a vector that represents the attributes of the voice represented by the machine learning-based voice model. The attributes can be generated using a combination of selective phrases and individual words. Within the voice authentication system that records the calls, the phrases and words can be segmented and stored as tagged data. For example, someone saying "password reset" can be a key phrase that is captured. Using methods such as Hidden Markov model, gaussian mixture model, deep learning models, among others, the voice authentication system may generate a vector representation and use this vector for comparison. The vector comparison could be accomplished using a vector similarity metric. An example of such a metric would be a multi-dimensional relative distance metric, such as leveraging an 'n'-dimensional Euclidean distance calculation to generate a per-dimension distance as well as an overall distance. The technique for measuring the distance would depend on the underlying technique used to generate the voice representation. By examining the relative distance of an incoming sample to existing ones, the voice authentication system would generate a confidence score.

In one example, upon detecting the incoming call, the voice authentication system may generate a voice vector based on the voice data of the incoming call. The voice authentication system may then compare the voice vector associated with the voice data of the caller with the voice vector generated for the voice model using the techniques disclosed herein. The voice authentication system and/or the voice model may determine a confidence score based on a similarity between the two voice vectors. If the confidence score is above a threshold, then the voice authentication system may consider the voice a match to the model, and may determine that the caller is a legitimate user of the user account. For example, the voice authentication system may determine that the caller is the legitimate user of the user account when the confidence score is above a threshold, and may determine that the caller is not the legitimate user of the user account when the confidence score is below the threshold. Once the caller has been verified, the confidence score can be leveraged as a way to gauge any drift that has occurred in an individual's speech over time as a way of improving the model for the user account. Furthermore, regardless whether the caller is determined to be a legitimate user of the user account, the voice data (e.g., the voice vector) may be stored in association of the user account, to indicate that such a caller has called regarding the user account. In addition, if the caller's voice data is determined to be not a legitimate user of the user account, the voice data may be classified into one of the generic voice model by comparing the voice data against each of the generic voice model.

In the second stage of the framework, the voice authentication system may use the voice data to determine whether the caller has previously called for another user account. In some embodiments, the voice authentication system may compare voice data (and/or the voice vector determined based on the voice data) against different voice models associated with different user accounts. For example, the voice authentication system may first compare the voice data (and/or the voice vector) against the different generic voice models to determine which generic voice model matches the caller. The voice authentication system may determine a confidence score for each generic voice model indicating how well the voice data of the caller matches the generic voice model. This confidence score can determine which model more closely represents the caller.

For example, a young male with a French accent would yield a high confidence score on the male-young-French-accent voice model but yield a much lower confidence score on the female-old-Russian model. Once the caller's voice matches with one of the generic voice models based on a certain threshold, individual voice vectors from the voice models specific to various user accounts, that were derived from the matched generic voice model, and various voice vectors associated with the matched generic voice model can be used to determine if the voice signature matches any specific previous caller. When the voice authentication system determines that the voice of the caller matches one or more previous caller that called on one or more other user accounts, the voice authentication system may alert another module of the online service provider (e.g., a chatbot) or the customer service agent accordingly. The voice authentication system may have a set of such models for every important intent that customers call the online service provider frequently or for what reasons fraudsters have historically called the online service provider. Once the system identifies voice vectors that have called multiple times for different accounts, the system may create a voice blacklist of fraudsters that can be shared.

In an example use case, the voice authentication system may facilitate detecting malicious activity relating to unverified user accounts. For example, a "Know your customer (KYC)" restriction can be placed on a user account when malicious activity associated with the user account has been detected (e.g., a fraudulent user has called to perform a transaction on that user account, etc.), which limits the number of activities that can be done on the user account including restricted withdrawals of any funds from the user account. Such accounts are often created for fraud purposes and once money is contributed into such accounts, customer service calls are made to lift the restrictions to allow transfer of money outside the user account. A single customer can make multiple calls for multiple accounts. Based on an intention of "lifting the KYC flag," the system may compare the voice vector with the trained machine learning-based models and detect that the same caller has called previously with the same intention for multiple accounts. The customer service agent can prompt the caller for more authentication information and place the caller on hold until more verification can be completed.

FIG. 1 is a block diagram of a networked system 100 suitable for implementing the anomaly detection system, the analysis system, the browser analysis system, and the voice authentication system described herein. As shown, system 100 may comprise or implement a plurality of devices, servers, and/or software components that operate to perform various methodologies in accordance with the described implementations. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given implementation and may be performed by a greater number or fewer number of devices and/or servers. One or more devices and/or servers may be operated and/or maintained by the same or different entity System 100 includes a service provider server 110 and an agent device 120 in communication over a network 140. Agent device 120 may be utilized to provide training data, view flagged transactions, and process additional transaction data to identify transactions indicating a prohibited transaction including potential fraud. In this regard, an agent may process and review the data with service provider server 110, where service provider server 110 may generate a machine learning model based on iteratively training using the training data, and further process the transaction data using the model to flag further transactions. Additionally, service provider server 110 may be used to output narratives for flagged transactions based on feature analysis that caused the machine learning engine to perform a classification.

Agent device 120 and service provider server 110 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Agent device 120 may be implemented as a communication device that may utilize appropriate hardware and software configured for wired and/or wireless communication with service provider server 110. For example, in one implementation, agent device 120 may be implemented as a personal computer (PC), a smart phone, laptop/tablet computer, wristwatch with appropriate computer hardware resources, eyeglasses with appropriate computer hardware (e.g. GOOGLE GLASS ®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Agent device 120 includes an alert review application 122, a report review application 124, a database 126, and a network interface component 128. Alert review application 122 may correspond to executable processes, procedures, and/or applications with associated hardware. In other implementations, agent device 120 may include additional or different modules having specialized hardware and/or software as required.

Report review application 124 may correspond to one or more processes to execute software modules and associated components of agent device 120 to provide features, services, and other operations associated with training a machine learning, deep learning, or other artificial intelligence (AI) model, as well as using the model for detection of prohibited transactions in transaction data sets. In this regard, report review application 124 may correspond to specialized hardware and/or software utilized by a user of agent device 120 that may be used to provide training and transaction data, as well as review results of a supervised machine learning engine having a model trained for fraudulent pattern recognition and narrative text output. For example, report review application 124 may be used to first provide training data and/or sets of data to service provider server 110 that includes transaction data sets for transaction processed by a financial entity, such as a bank or financial institution, payment service provider, or other transaction processor.

Service provider server 110 may utilize features within the data sets to classify the transactions according to one or more classifiers, which may flag one or more transactions as potentially prohibited based on laws, rules, or regulations. The data sets may be annotated, and flagged transactions may be displayed through report review application 124. An agent may identify any false positives in the flagging of transactions as potentially prohibited, which may be provided back to service provider server 110 for retraining (e.g., iteratively and/or continuously training) of the machine learning model. The flagged transactions may include a narrative displayable through report review application 124, such as a textual description of the reason for flagging the transaction(s) by the model. After training, agent device 120 may further be used to view the results of the model processing other transaction data sets, such as for other transaction processed by one or more entities.

Agent device 120 may further include database 126 stored on a transitory and/or non-transitory memory of agent device 120, which may store various applications and data and be utilized during execution of various modules of agent device 120. Database 126 may include, for example, identifiers such as operating system registry entries, cookies associated with alert review application 122 and/or other applications 112, identifiers associated with hardware of agent device 120, or other appropriate identifiers, such as identifiers used for payment/user/device authentication or identification, which may be communicated as identifying the user/agent device 120 to service provider server 110. Database 126 may further include any transaction data sets used for training and/or processing with a machine learning model generated by service provider server 110.

Agent device 120 includes at least one network interface component 128 adapted to communicate with service provider server 110. In various implementations, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 110 may be maintained, for example, by an online service provider, which may provide identification of prohibited transactions, such as fraudulent transactions, in transaction data sets processed by a financial or transaction processing entity (including service provider server 110) using a machine learning or other AI model. In this regard, service provider server 110 includes one or more processing applications which may be configured to interact with agent device 120 to train and utilize the model for prohibited transaction identification. In one example, service provider server 110 may be provided by PAYPAL®, Inc. of San Jose, CA, USA. However, in other implementations, service provider server 110 may be maintained by or include another type of service provider.

Service provider server 110 of FIG. 1 includes an event detection server 150, a transaction processing server 160, and a network interface component 170. Event detection server 150, transaction processing server 160, and other applications 134 may correspond to executable processes, procedures, and/or applications with associated hardware. In other implementations, service provider server 110 may include additional or different modules having specialized hardware and/or software as required.

In some embodiments, the event detection server 150 may implement the functionalities of the anomaly detection system, the analysis system, the browser analysis system, and the voice authentication system described herein. The event detection server 150 may also be associated specialized hardware of service provider server 110 to provide a framework to train a machine learning model for one or more prediction engines that can detect prohibited transactions, such as fraud, by probabilistically detecting anomalies in transaction datasets, which will be described in more detail in FIGS. 2 and 4. In one or more implementations, the event detection server 150 may provide a framework for an analysis platform for actionable insight into user interaction data, which will be described in more detail in FIGS. 2 and 3. In other implementations, the event detection server 150 may provide a platform for automated device data retrieval and analysis, which will be described in more detail in FIGS. 5-7. In still other implementations, the event detection server 150 may provide a voice vector framework for authenticating user interactions, which will be described in more detail in FIGS. 8-10.

In various implementations, service provider server 110 includes at least one network interface component 170 adapted to communicate agent device 120 and/or other entities over network 140. In various implementations, network interface component 170 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various implementations, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

The customer device 130, in various implementations, may be implemented as a communication device using any appropriate combination of hardware and/or software configured for wired and/or wireless communication over the network 140. For example, in one implementation, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data.

The customer device 130 may install and execute a client-side service application 132 received from the transaction processing server 110 to facilitate one or more transaction processes (e.g., point-of-sale transactions). The client-side service application 132 may allow a user to send payment transaction requests to the transaction processing server 110, which includes communication of data or information needed to complete the request, such as funding source information. The customer device 130 may include one or more browser applications that may be used, for example, to provide a convenient interface to permit a user to browse information available over network 140. For example, in one implementation, the one or more browser applications may be implemented as a web browser configured to view information available over the Internet, such as a user account for online shopping and/or merchant sites for viewing and purchasing goods and/or services.

The customer device 130, in various implementations, may include other applications as may be desired in one or more implementations of the present disclosure to provide additional features available to the user. For example, the other applications may include security applications for implementing server-side security features, programmatic client applications for interfacing with appropriate APIs over network 140, or other types of applications. The other applications may also include email, texting, voice and IM applications that allow a user to send and receive emails, calls, texts, and other notifications through network 140. In various implementations, the other applications may include financial applications, such as banking, online payments, money transfer, or other applications associated with transaction processing server 110. The other applications include a software program, such as a graphical user interface (GUI), executable by a processor that is configured to interface to a user.

The customer device 130 may further include cache 134 stored to a transitory and/or non-transitory memory of customer device 130, which may store various applications and data and be utilized during execution of various modules of customer device 130. Thus, cache 134 may include, for example, identifiers such as operating system registry entries, cookies associated with the one or more browser applications and/or the other applications, identifiers associated with hardware of customer device 130, or other appropriate identifiers, such as identifiers used for payment/user/device authentication or identification, which may be communicated as identifying customer device 130 to the service provider server 110. For example, the cache 134 may store device attributes of the customer device 130, including, but not limited to, application information associated with various applications on the customer device 130, version information of the various applications, cookie information, a language used on the customer device 130, screen attributes such as resolution, size, etc., and other information associated with the customer device 130. In various implementations, account information and/or digital wallet information may be stored to cache 134 for use by the customer device 130.

The cache 134, in one implementation, may include at least one user identifier, which may be implemented, for example, as operating system registry entries, cookies, identifiers associated with hardware of the customer device 130 (e.g., a media control access (MAC) address), or various other appropriate identifiers. The user identifier may include one or more attributes related to the user of the customer device 130, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier may be passed with a user login request to the transaction processing server 110 via the network 140, and the user identifier may be used by the service provider server 110 to associate the user with a particular user account maintained by the transaction processing server 160.

Customer device 130 includes at least one network interface component 170 adapted to communicate with the service provider server 110 and/or the transaction processing server 160. In various implementations, network interface component 170 may include a modem, an Ethernet device, a broadband device, a satellite device and/or various other types of wired and/or wireless network communication devices including microwave, radio frequency, infrared, Bluetooth, and near field communication devices.

Even though only one customer device 130 is shown in FIG. 1, it has been contemplated that one or more user devices (each similar to customer device 130) may be communicatively coupled with the service provider server 110 via the network 140 within the networked system 100.

Figure 2:
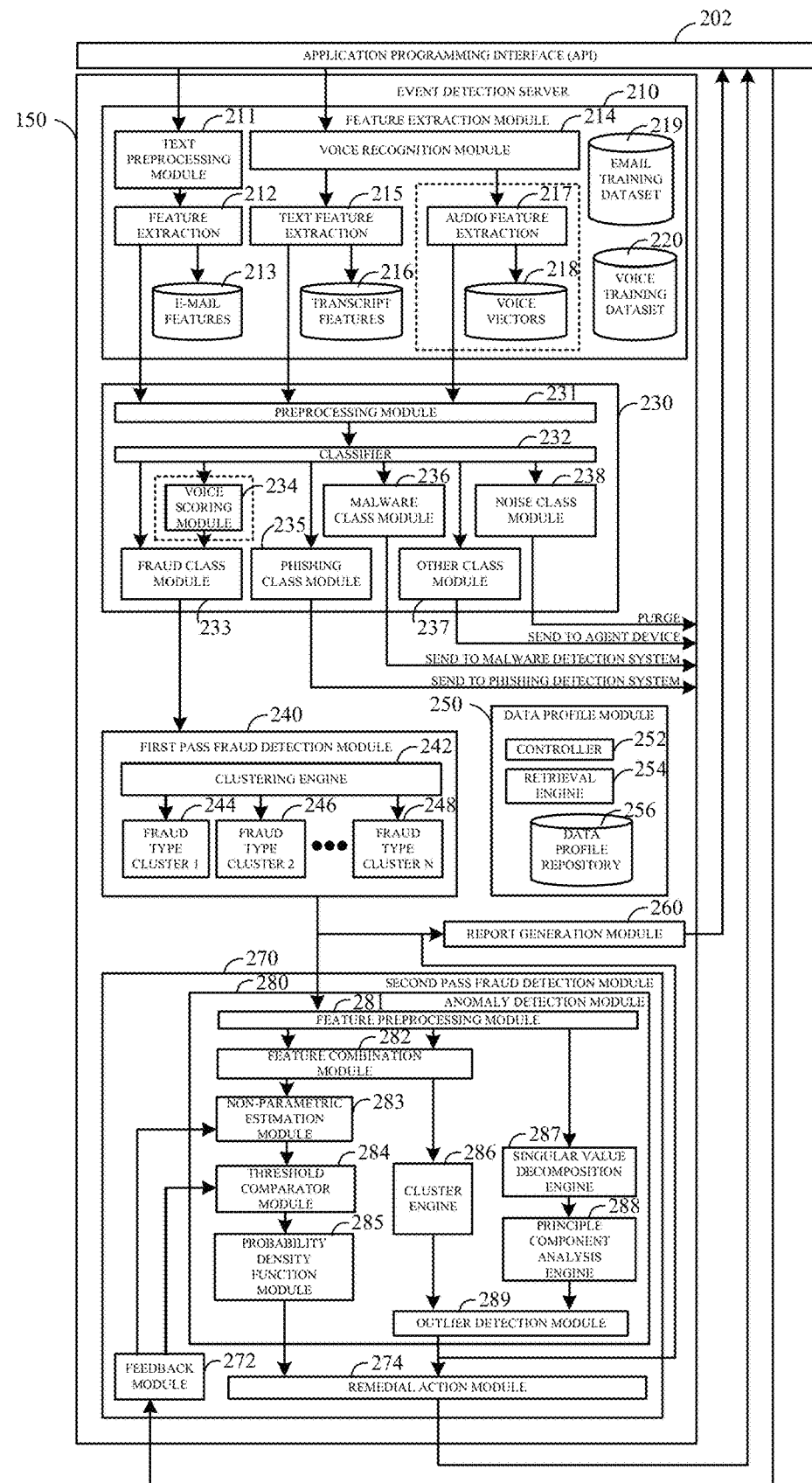
FIG. 2 illustrates a block diagram of an event detection server, according to an implementation of the present disclosure.

FIG. 2 illustrates a block diagram of the event detection server 150, according to an implementation of the present disclosure. The event detection server 150 includes a feature extraction module 210, a classification module 230, a first pass fraud detection module 240, a data profile module 250, a report generation module 260, and a second pass fraud detection module 270. In various aspects, the network interface component 125 includes API 202. The API 202 is coupled to the event detection server 150 with bidirectional signal paths to the second pass fraud detection module 270. The feature extraction module 210 includes a text preprocessing module 211, a feature extraction engine 212, an e-mail features repository 213, a voice recognition module 214, a text feature extraction engine 215, a transcript features repository 216, an audio feature extraction engine 217, a voice vectors repository 218, an email training dataset 219 and a voice training dataset 220. In some embodiments, when the event detection server 150 detects a communication (e.g., an email, a call, a chat) from a user device to the service provider server 110, the feature extraction module 210 may extract features from the communication. The extracted features may include textual data features extracted from a text portion of the communication and/or audio data features extracted from an audio portion of the communication.

For example, the feature extraction engine 212 of the feature extraction module 210 can generate textual data features with the textual data. In some examples, the textual data refers to text extracted from electronic document items received by the text preprocessing module 211. The textual data features can be stored in the e-mail features repository 213. In some aspects, the voice recognition module 214 can process the audio properties of a received audio file (e.g., voicemail) to produce a textual transcript of the received audio file. The voice recognition module 214 may utilize standard speech processing techniques to translate the audio to text. The text feature extraction engine 215 can generate textual data features with the textual transcript associated with the received audio file. The textual data features from the text feature extraction engine 215 can be stored in the transcript features repository 216. The voice recognition module 214 may provide a processed speech datafile that includes speech properties of the received audio file. The audio feature extraction engine 217 may generate audio data features with the processed speech datafile. The audio feature extraction engine 217 may generate voice vectors with the audio data features, where each portion (or field) of respective voice vectors corresponds to a different combination of audio data features. For example, each combination of audio data features may represent word and/or phrases of a specific spoken language. The voice vectors can be stored in the voice vectors repository 218. In some aspects, the feature extraction module 210 can map (or transform) the textual data features and the audio data features into respective ones of different feature representations. In other aspects, the preprocessing module 231 may be tasked to perform the feature representation mapping in lieu of the feature extraction module 210.

The classification module 230 includes a preprocessing module 231, a classifier 232, a fraud class module 233, a voice scoring module 234, a phishing class module 235, a malware class module 236, other class module 237 and a noise class module 238. In some embodiments, the classification module 230 may determine an intent of the communication based on the extracted features, and may select a machine learning-trained classifier to classify the communication in one or more of communication categories.

The first pass fraud detection module 240 includes a clustering engine 242 and fraud type clusters 244, 246, and 248. In some embodiments, the first pass fraud detection module 204 may use the clustering engine 242 to assign the communication to one of the clusters (e.g., one of the fraud type clusters 244, 246, and 248) of past communications based on the intent and the categories associated with the communication. Embodiments are discussed with reference to FIG. 3.

The data profile module 250 includes a controller 252, a retrieval engine 254 and a data profile repository 256. The second pass fraud detection module 270 includes an anomaly detection module 280, a feedback module 272 and a remedial action module 274. In some embodiments, the second pass fraud detection module 270 may derive a unique pattern of activity from the communication and may detect one or more anomalies in the communication based on the unique pattern of activity. For purposes of brevity and efficient explanation of the functional aspects associated with the components described in FIG. 2, the block diagram of FIG. 2 will be described in reference to the processes of FIGS. 3 and 4.

Figure 3:
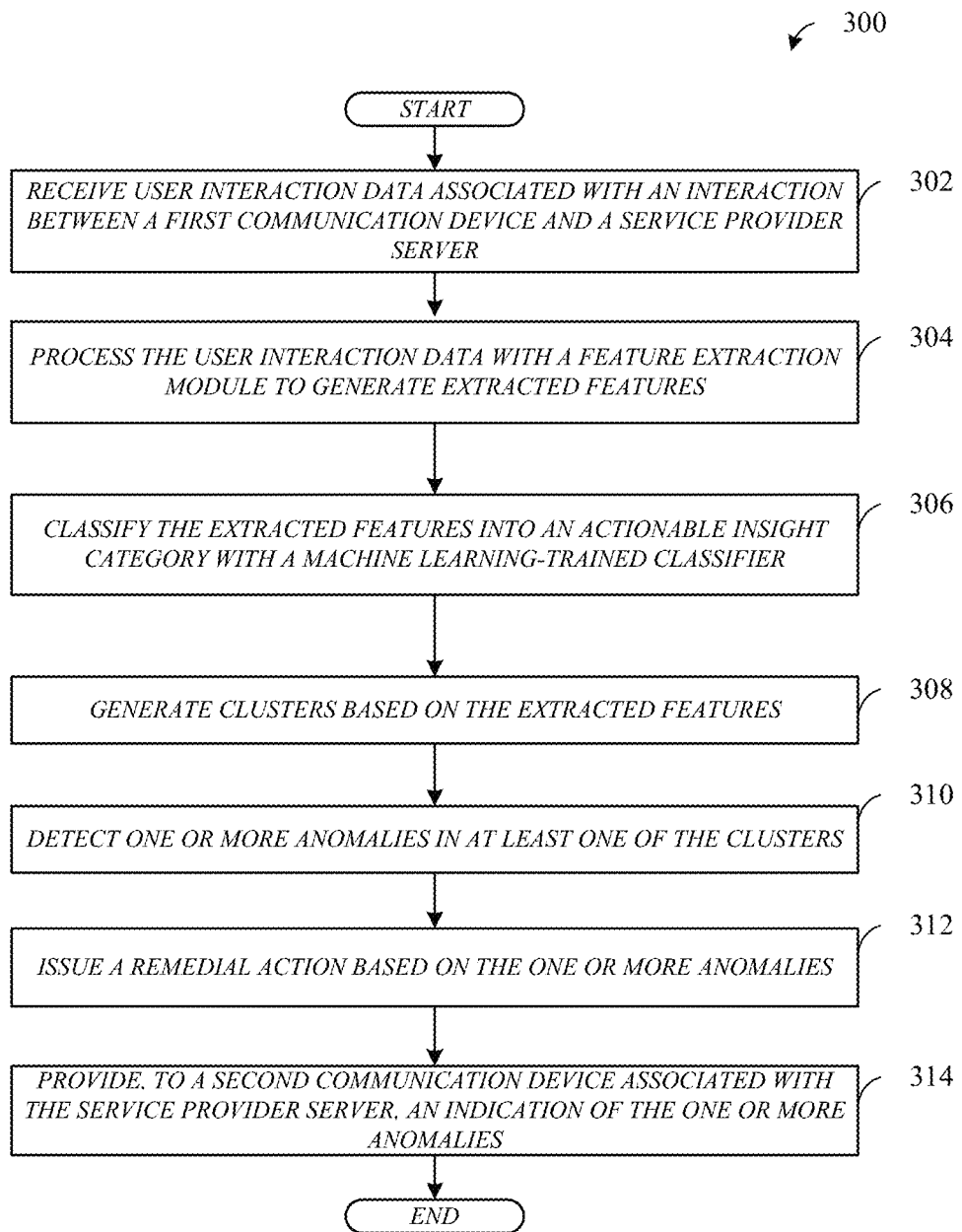
FIG. 3 is a flowchart of an example process of actionable insight analysis into user interaction data, according to an implementation of the present disclosure.

FIG. 3 is a flowchart of an example process 300 of actionable insight analysis into user interaction data, according to an implementation of the present disclosure. One or more of the steps 302-314 of process 300 may be implemented, at least in part, in the form of executable code stored on non-transitory, tangible, machine-readable media that when run by one or more processors may cause the one or more processors to perform one or more of the steps 302-314. Some examples of computing devices, such as computer system 1100 of FIG. 11 may include non-transitory, tangible, machine readable media that include executable code that when run by one or more processors (e.g., processor 1112) may cause the one or more processors to perform the steps of process 300. As illustrated, the process 300 includes a number of enumerated steps, but aspects of the process 300 may include additional steps before, after, and in between the enumerated steps. In some aspects, one or more of the enumerated steps may be omitted or performed in a different order.

The process 300 begins at step 302, where the event detection server 150 receives user interaction data (e.g., e-mails, an audio clip of a phone call, etc.) associated with an interaction between the customer device 130 and a service provider server (e.g., the transaction processing server 160). In some aspects of receiving the user interaction data, the text preprocessing module 211 may access, through the API 202, textual data associated with a first type of interaction from a first data structure in a data repository communicably coupled to the service provider server 110. In some examples, the text preprocessing module 211 may prepare the received textual data for processing by the feature extraction engine 212, such as removing any unnecessary terms and/or characters that help improve the extraction performance. In one or more aspects, the voice recognition module 214 may access, through the API 202, audio data associated with a second type of interaction from a second data structure in the data repository. In some aspects, the feature extraction module 210 may group the textual data with the audio data into the user interaction data to combine the first type of interaction with the second type of interaction. In this respect, the textual data and the audio data may correspond to different portions of the user interaction data. In some aspects, the data repository may be remote and/or external to the service provider server 110. In other aspects, the data repository may be internal to the service provider server 110. For example, the data repository is, or includes at least a portion of, the data profile repository 256.

Next, at step 304, the feature extraction module 210 of the event detection server 150 processes the user interaction data by extracting one or more features from the user interaction data. In some aspects, the extracted features includes textual data features and audio data features as described herein. In various aspects, the feature extraction module 210 can select one of multiple different feature extraction algorithms based on a comparison of performance metrics between each of the different feature extraction algorithms. In some examples, the different feature extraction algorithms include, among others, bag-of-words, term frequency-inverse document frequency (TF-IDF), Doc2Vec, and Latent Dirichlet Allocation (LDA). As such, the feature extraction module 210 can apply the selected feature extraction algorithm to the user interaction data.

Subsequently, at step 306, the classifier 232 of the event detection server 150 classifies the extracted features into one of many actionable insight categories with a machine learning-trained classifier. For example, a first actionable insight category may correspond to a fraudulent activity implemented with the fraud class module 233, a second actionable insight category may correspond to a phishing activity implemented with the phishing class module 235, a third actionable insight category may correspond to a malware activity implemented with the malware class module 236, a fourth actionable insight category may correspond to a noise activity implemented with the noise class module 238, and a fifth actionable insight category may correspond to other (or miscellaneous) activities implemented with the other class module 237. The output of the fraud class module 233 is fed to the first pass fraud detection module 240. The output of the phishing class module 235 may include a notification transmitted to a phishing detection system (not shown), indicating that the user interaction may correspond to a phishing scheme.

The phishing detection system can analyze and report phishing network links (e.g., URLs) extracted from phishing emails. The output of the malware class module 236 includes signaling that is sent to a malware detection system (not shown). The signaling may be first sent to a virus analysis process to identify whether the manipulated file has been previously identified as malicious and to acquire an associated signature that can be used for blocking. If the virus analysis process does not return a result, then the malware detection system can receive customer input with malware attachments for download into an isolated virtual environment. The customer input with malware attachments may be analyzed for static (code based) and dynamic (interaction with the sandbox system) to identify the impact and report the findings to the agent device 120. The output of the other class module 237 includes signaling that is sent to the agent device 120.

Some examples of the other category may include customer complaints and/or emails about mobile applications not working properly, queries for information regarding products and/or services associated with the service provider server 110, or the like. In the other category, the classifier 232 may identify customer complaints regarding usage of products and/or services associated with the service provider server 110 that can serve as feedback for use by the transaction processing server 160 to identify any underlying issues in the services and/or products. The output of the noise class module 238 includes signaling that is purged. Some examples of noise may include any data that does not relate to the service associated with the service provider server 110, advertisements, subscription emails and the like. Purging the noise activity can help increase the efficiency and accuracy of the system. For purposes of brevity, the remainder of the steps in the process 300 will be discussed in reference to the fraudulent activity category, but can also apply to other categories.

In some implementations, the classifier 232 determines an intent of the interaction from the feature representations using the machine learning-trained classifier. In some aspects, the intent corresponds to one of the different actionable insight categories. In some implementations, the classification module 230 selects one of the machine learning-trained classifiers implemented by the classifier 232 based on a comparison of performance metrics between each of the machine learning-trained classifiers. In some aspects of determining the intent of the interaction, the classifier 232 determines the intent of the interaction using the selected one of the machine learning-trained classifiers.

In some implementations, the feature extraction module 210 accesses user interaction datasets associated with respective ones of interactions between different communication devices (including the customer device 130) and the service provider server 110. The classifier 232 can then determine an intent of each of the interactions from extracted features associated with each of the interactions using the machine learning-trained classifier. In turn, the classifier 232 can classify each of the interactions as a respective category of the actionable insight categories based at least in part on the intent of that interaction.

In an offline operation, the classification module 230 may include one or more processors adapted to generate multiple machine learning-based networks based on the actionable insight categories. In some aspects, the machine learning-based networks correspond to the respective actionable insight categories. The one or more processors in the classification module 230 may be adapted to train each of the machine learning-based networks with a respective training dataset to form different machine learning-trained classifiers. In some aspects, the respective training dataset facilitates supervised learning by including labeled interaction data indicating what information pertains to which of the actionable insight categories. In some aspects of determining the intent of the interaction using the machine learning-trained classifier, the classification module 230 can select the machine learning-trained classifier from the machine learning-trained classifiers.

Next, at step 308, the clustering engine 242 of the first pass fraud detection module 240 generates multiple clusters based on the extracted features using one or more clustering algorithms. For example, the clusters may include cluster 244 (depicted as "fraud type cluster 1"), cluster 246 (depicted as "fraud type cluster 2"), and cluster 248 (depicted as "fraud type cluster N"). In some examples, the one or more clustering algorithms include, among others, K-means, Gaussian mixture model (GMM), and hierarchical. In one or more implementations, the clustering engine 242 maps the interaction to a first cluster of the different first clusters based at least in part on the determined intent. In some aspects, each of the first clusters corresponds to a particular type of activity in a first actionable insight category of the different actionable insight categories. In some examples, the first actionable insight category corresponds a fraudulent activity classification. In some examples, the particular type of activity may correspond to one of multiple types of fraudulent activity (e.g., fraud type cluster 1, fraud type cluster 2, fraud type cluster N). In some implementations, the clustering engine 242 determines whether the interaction maps to at least one of the first clusters and generates a new cluster to be included in the first clusters when the interaction is determined to not map to the at least one of the first clusters. In some aspects, the new cluster corresponds to a new type of event in the first actionable insight category.

Subsequently, at step 310, the event detection server 150 detects one or more anomalies in at least one of the clusters through an anomaly detection operation. In some aspects of detecting whether the one or more anomalies are present, the event detection server 150 may utilize the second pass fraud detection module 270 to generate second clusters within the at least one of the first clusters using one or more clustering algorithms. In some aspects, each of the second clusters corresponds to a unique pattern of activity associated with the particular type of activity in the first actionable insight category. In some implementations, the second pass fraud detection module 270 may utilize the cluster engine 286 to generate the second clusters. The second pass fraud detection module 270 may determine whether the unique pattern of activity includes the one or more anomalies for the particular type of activity. In some aspects, the second pass fraud detection module 270 determines that the particular type of activity represents malicious activity when the unique pattern of activity is determined to include the one or more anomalies.

Next, at step 312, the event detection server 150 issues a remedial action for the interaction by further authenticating the customer device 130 based on the one or more anomalies detected in the at least one of the clusters. In some aspects, the event detection server 150 issues the remedial action based on the mapping of the interaction to the first cluster. In some implementations, the event detection server 150 issues the remedial action using the remedial action module 274. In other implementations, the event detection server 150 issues the remedial action using the report generation module 260.

Subsequently, at step 314, the event detection server 150 provides, through the API 202 to a second communication device (e.g., the agent device 120) associated with the service provider server 110, an indication of the one or more anomalies. In some aspects, the event detection server 150 generates an alert notification that identifies the malicious activity using the remedial action module 274. In some aspects, in providing the indication, the remedial action module 274 sends, through the API 202 to the agent device 120 over the network 140, the alert notification. In some implementations, the remedial action module 274 conditionally sends the alert notification. For example, the remedial action module 274 may determine whether a threshold number of anomalies is detected in the first cluster. The remedial action module 274 generates a report indicating the one or more anomalies when the threshold number of anomalies is detected. In an aspect, the detected number of anomalies exceeds the threshold number of anomalies.

Figure 4:
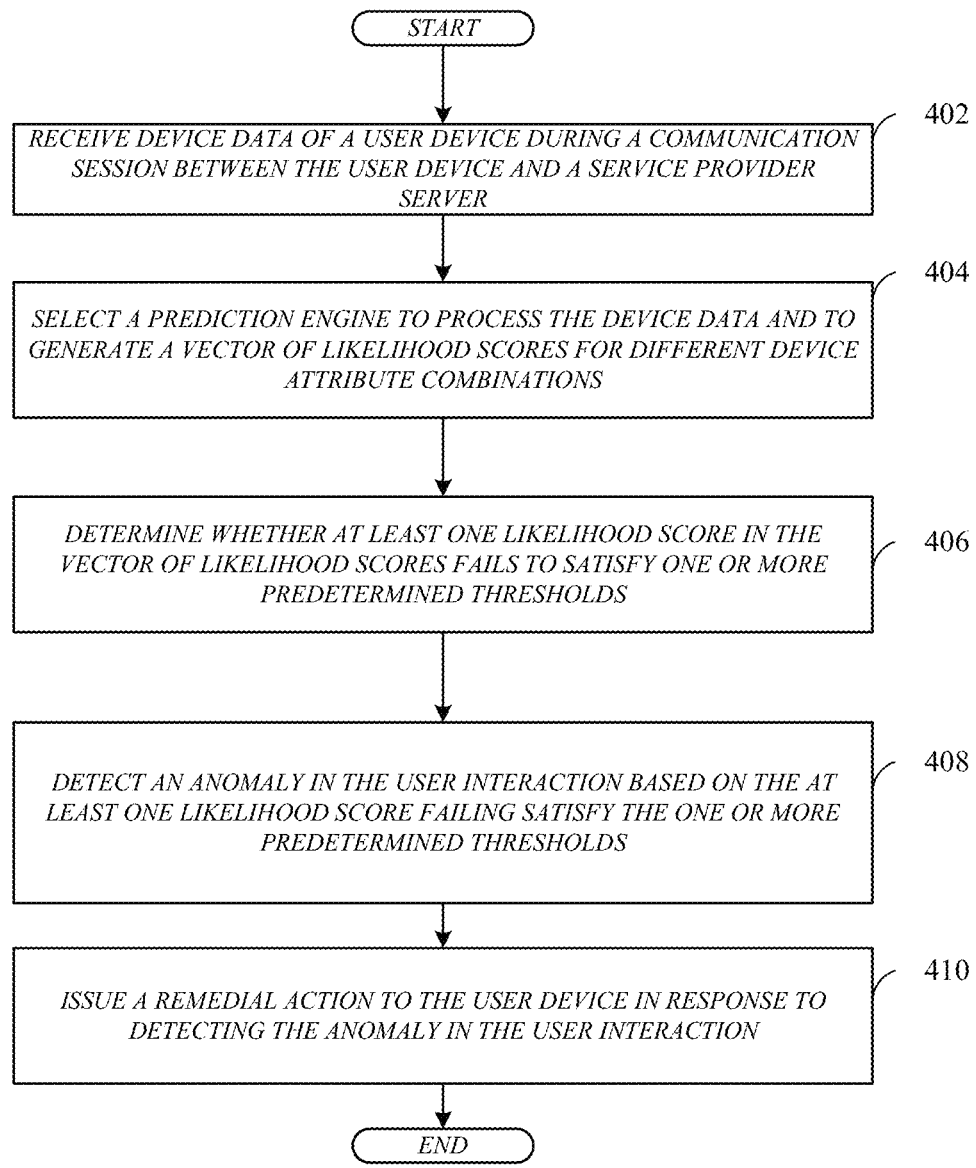
FIG. 4 is a flowchart of an example process of probabilistic anomaly detection and mediation, according to an implementation of the present disclosure.

FIG. 4 is a flowchart of an example process 400 of probabilistic anomaly detection and mediation, according to an implementation of the present disclosure. One or more of the steps 402-410 of process 400 may be implemented, at least in part, in the form of executable code stored on non-transitory, tangible, machine-readable media that when run by one or more processors may cause the one or more processors to perform one or more of the steps 402-410. Some examples of computing devices, such as computer system 1100 may include non-transitory, tangible, machine readable media that include executable code that when run by one or more processors (e.g., processor 1112) may cause the one or more processors to perform the steps of process 400. As illustrated, the process 400 includes a number of enumerated steps, but aspects of the process 400 may include additional steps before, after, and in between the enumerated steps. In some aspects, one or more of the enumerated steps may be omitted or performed in a different order.

The process 400 begins at step 402, where the feature preprocessing module 281 of the anomaly detection module 280 receives device data of a user device (e.g., the customer device 130) during a communication session between the user device and a service provider server 110. For example, a user, through the user device, may communicate with the service provider server 110 (e.g., accessing a website associated with the service provider server 110, initiating an electronic transaction with the service provider server 110, etc.). Upon detecting the communication session between the user device and the service provider server 110, the feature preprocessing module 281 may obtain device data associated with the user device. In some aspects, the device data may include device attributes, that in combination, is unique to a type of device (e.g., a manufacturer, a model, etc.) associated with the customer device 130. Thus, the combination of the device attributes may be used by the feature preprocessing module 281 to verify whether the user device is of a particular type (e.g., a particular manufacturer, a particular model, etc.) that the user device purports to be. In an aspect, each device attribute in the different of device attributes is marked with a different descriptor and a corresponding attribute value that are specific in identifying the device type of the customer device 130. For example, the different device attributes may include, among others, a pixel depth attribute, version information of a particular application (e.g., a web browser) of the customer device 130, an identifier, a list of plug-ins installed on the customer device 130, a font used in the customer device 130, a language used in the customer device 130, screen attributes such as a width, a height, a resolution, and other attributes.

In some aspects of receiving the device data, the feature preprocessing module 281 may receive the device data of the customer device 130 in response to occurrence of an event associated with the customer device 130. For example, the event occurrence may include a user interaction between the customer device 130 and the service provider server 110, such as a connection attempt to the service provider server 110. In some aspects, the event may identify a device type of the customer device 130 (e.g., a particular manufacturer, a particular model, etc.) and a type of the user interaction (e.g., connection attempt).

In other aspects of receiving the device data, the feature preprocessing module 281 may receive a first logs indicating a first number of events associated with user devices (e.g., other customer devices 130*d*) that occur in a first window of time. In some aspects, each event of the first number of events may include first device data corresponding to the first window of time for a user device of the user devices. The feature preprocessing module 281 also may receive second logs indicating a second number of events associated with the user devices that occur in a second window of time different from the first window of time (e.g., occurring at a later time). In some aspects, each event of the second number of events may include second device data corresponding to the second window of time for a user device of the user devices.

In still other aspects of receiving the device data, the feature preprocessing module 281 may receive user queries. In some aspects, each of the user queries may include a user interaction between a user account of a service (e.g., electronic payment processing) and the service provider server 110 associated with the service. The feature preprocessing module 281 may perform an extraction operation, where the feature preprocessing module 281 may extract metadata of user interactions from the user queries. In some aspects, the metadata includes the device data of the customer device 130.

In some implementations, the feature combination module 282 of the anomaly detection module 280 can select a combination of features from the different features. In some aspects, the combination of features includes features having a variance of expected values that exceeds a threshold variance. In some aspects of selecting the combination of features, the feature combination module 282 selects multiple device attribute combinations from the different of device attributes that represent features of interest. In some aspects, each of the multiple device attribute combinations corresponds to a different combination among a subset of the different device attributes.

Next, at step 404, the anomaly detection module 280 selects a prediction engine to process the device data and generate a vector of likelihood scores for different device attribute combinations. For example, the anomaly detection module 280 may select a prediction engine from different prediction engines to process the device data, where the selected prediction engine corresponds to a non-parametric statistical model of different of non-parametric statistical models. The anomaly detection module 280 may generate a vector of likelihood scores for different device attribute combinations with different non-parametric statistical models. In some aspects, the non-parametric estimation module 283 may generate a histogram for each of the different device attribute combinations of the particular device type and estimate a probability density function distribution that best fits the histogram. In some aspects, the histogram includes a two-dimensional relationship between first attribute values of a first device attribute against second attribute values of a second device attribute in a given device attribute combination of the device attribute combinations. In other aspects, the histogram can indicate relationships between N device attributes in N-dimensional space in a given device attribute combination of the device attribute combinations, where N is a positive integer.

In some implementations, in an offline operation, the anomaly detection module 280 generates a first number of non-parametric statistical models with first predetermined thresholds based on a first window of time, and the anomaly detection module 280 generates a second number of non-parametric statistical models with a second predetermined thresholds based on a second window of time. In some aspects, the second window of time is subsequent to the first window of time. In one or more aspects, at least one of the first predetermined thresholds is different from at least one of the second predetermined thresholds.

In some aspects, the non-parametric statistical models include a machine learning-based models. In one or more implementations, the anomaly detection module 280 can train the machine learning-based models with a training dataset that indicates user interactions captured within one or more predetermined windows of time and a mapping of the user interactions to predetermined probability density function distributions. The training of the machine learning-based models can occur in an offline mode of the anomaly detection module 280. In some aspects of selecting the prediction engine of the prediction engines, the anomaly detection module 280 processes device attributes from the device data with the machine learning-based models. In turn, the anomaly detection module 280 can generate a likelihood prediction for each of the device attributes with the different machine learning-based models.

In some aspects, each of the machine learning-based models includes one or more executable programs and/or models configured to initially process one or more training data sets having transactions processed by an entity, including service provider server 110. The transactions in the training datasets 219, 220 may include legitimate transactions and malicious and/or fraudulent transactions, such as those transactions prohibited due to money launder laws, rules, and regulations when entity engage in illegal and/or malicious behavior. The training data set may include labeled and/or unlabeled data, which may include classifications of valid transactions and prohibited transactions (e.g., "no fraud" or "potential or detected fraud," respectively). These may be labeled by a human operator, such as an agent that reviews transactions for prohibited activity such as fraud, and the like for reporting to a regulatory agency, body, or entity. Thus, one or more classifiers may be established by the agent or entity processing the data, or may be determined based on outlier transactions or transactions having features indicating prohibited conduct or behavior. Thus, the classifiers may be built and trained so that classifications may be assigned to particular data points (e.g., transactions) within each of the training datasets 219, 220.

The training datasets 219, 220 may include different features, such as a platform for the transaction (e.g., mobile, web, etc.), an account number, a transaction identifier (ID), a transaction type (e.g., payment, gambling, etc.), an encrypted transaction ID, a parent transaction ID, a created and/or update date, a US dollar equivalent amount (e.g., where credits and sent payments may be in a negative format), a local currency amount and/or code, a billing and/or shipping address, a funding source and/or backup funding source, a bank account number, a bank hash-based message authentication code (HMAC), a card number and/or hash, a card bun HMAC, a card issuer, a balance and/or impact on a balance due to the transaction, a transaction status and/or items within the transaction, notes and/or subject lines within messages for the transaction, an automated clearinghouse return codes, an ID on another marketplace or platform, a counterparty name, a counterparty account number, a counterparty account type, a counterparty country code, a counterparty email, a counterparty transaction ID, a counterparty ID on a marketplace or platform, a counterparty account status, a referring URL, an IP address, whether the transaction was successful, and a date (e.g., month/year) of transaction.

Other exemplary features and/or categories of features in the training datasets 219, 220 that may be important to training the values and weights of a machine learning model may include risk rules regarding flagging of transactions as incorrect descriptions or messages, complaints and flags by other parties within transactions, gambling activities including fantasy sports, specific country accounts and transaction activities from countries marked as high risk for fraud, a same or similar account owner for a sender and receiver in a transaction, counterfeit flagged accounts, volume of payments in a high risk transaction corridor or category, a spike in activity or transaction value after a dormant or inactive period, a number of transactions and total amount (including if the transactions were cross-border transactions), a previous account takeover flag, a malicious seller flag, an account restriction due to previous malicious use or rule violation, a cross-border payment from a device using in-person payment instrument processing (e.g., through processing a payment card EMV chip or magnetic stripe to provide the payment), a check deposit amount and transfer of deposited funds, a deposit and withdrawal/transfer of all or a substantial portion of the deposit within a time period, a gift card usage and withdrawal/transfer of such funds, a premier account usage and activity/inactivity, and/or a number of transactions between the same parties.

When generating machine learning engine 132, the features in the training datasets 219, 220 may be used to generate different layers of a machine learning model used to detect the prohibited transactions, which may include different nodes, values, weights, and the like. The machine learning-based model may utilize a supervised machine learning algorithm, function, or technique that utilizes continuous and/or iterative learning to generate the model. In some implementations, the machine learning-based model may be implemented as a deep learning network, including a convolution neural network, a recurrent neural network, or a deep neural network. When training the model, the anomaly detection module 280 may utilize feedback and annotations or labeling from the agent device 120 to iteratively train the model. For example, transactions in the training data set and/or other data sets may be flagged using the machine learning technique to identify prohibited transactions, where the agent device 120 may send an indication that the flagged transactions were not actually prohibited (e.g., not indicative or including fraud). Identification of these false positives may be used to retrain the machine learning-based model in a continuous and/or iterative process so that false positives may be reduced and/or eliminated, and the machine learning-based model may more accurately predict and detect fraud or other prohibited transactions. Thus, the machine learning-based model is trained for detection of prohibited transactions, as well as review of results from the machine learning-based model that has been modeled for prohibited transaction detection.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Subsequently, at step 406, the anomaly detection module 280 determines whether at least one likelihood score in the vector of likelihood scores fails to satisfy one or more predetermined thresholds. For example, the anomaly detection module 280 may use the threshold comparator module 284 to compare each of the vector of likelihood scores against the one or more predetermined thresholds to determine whether at least one likelihood score fails the one or more predetermined thresholds. The anomaly detection module 280 may also determine that the at least one likelihood score corresponds to a particular device attribute combination.

Next, at step 408, the anomaly detection module 280 detects an anomaly in the user interaction based on the at least one likelihood score failing to satisfy the one or more predetermined thresholds. For example, the anomaly detection module 280 may select an anomaly detection engine from different anomaly detection engines to detect an anomaly in the user interaction based on a result of the comparison operation that indicates at least one likelihood score in the vector of likelihood scores does not satisfy the one or more predetermined thresholds. In some embodiments, the probability density function module 285 may process device attributes from the device data with a probability density function algorithm. The probability density function module 285 can generate a probability density distribution with the probability density function algorithm. In some aspects, the probability density distribution includes a two-dimensional relationship between different likelihood values against different device attribute values for a given device attribute combination from the different device attribute combinations. For example, for each device attribute combination in the different device attribute combinations, the anomaly detection engine can generate a likelihood metric indicating that a corresponding attribute value associated with the user interaction is an actual occurrence. In other aspects, the probability density function module 285 may obtain a user profile that indicates a user behavior associated with one or more of the user device or a user account of a service, and the probability density function module 285 may determine a likelihood metric indicating that a corresponding attribute value associated with the user interaction is an actual occurrence, based on the user profile.

In other implementations, the cluster engine 286 of the anomaly detection module 280 can apply a clustering algorithm to a vector of likelihood scores to generate one or more clusters. This may be an alternative track to the use of the non-parametric estimation module 283 and the probability density function module 285. The outlier detection module 289 of the anomaly detection module 280 can detect a data point corresponding to at least one likelihood score of the vector of likelihood scores that is outside of the one or more clusters. The outlier detection module 289 can apply a Euclidean multi-dimensional distance calculation to determine a distance from the one or more clusters in N-dimensional space, where N is a positive integer. The outlier detection module 289 determines whether the data point is a member of the one or more clusters or an outlier based on the distance. In some aspects, the outlier detection module 289 determines that the data point is an outlier based on the distance being greater than a threshold distance. In this respect, the outlier corresponds to the anomaly in the user interaction.

In still other implementations, the singular value decomposition engine 287 of the anomaly detection module 280 can apply a singular value decomposition algorithm to a vector of likelihood scores to determine one or more principle components in the vector of likelihood scores in terms of eigenvalues and eigenvectors. In some aspects, each of the one or more principle components identifies which of the device attributes has a highest variance based at least on a ranking of the eigenvectors by order of variance. The principle component analysis engine 288 of the anomaly detection module 280 then applies a projection operation by matrix multiplication to project new attribute values in a direction of a principle component through an eigenvector that corresponds to the principle component. In turn, the principle component analysis engine 288 can generate a cluster in an eigenspace with the projected new attribute values. The outlier detection module 289 can then detect a data point corresponding to at least one projected new attribute value that is outside of the cluster. The outlier detection module 289 applies a Euclidean multi-dimensional distance calculation to determine a distance from the cluster and determines whether the data point is a member of the cluster or an outlier based on the distance. In some aspects, the outlier detection module 289 determines that the data point is an outlier based on the distance being greater than a threshold distance. In this respect, the outlier corresponds to the anomaly in the user interaction.

Subsequently, at step 410, the remedial action module 274 of the second pass fraud detection module 270 issues a remedial action to the customer device 130 through the API 202 in response to detecting the anomaly in the user interaction. For example, the remedial action module 274 may further authenticate the customer device 130 when the anomaly in the user interaction is detected.

In some aspects, in issuing the remedial action, the remedial action module 274 issues, through the API 202, a first remedial action that denies the customer device 130 with access to the service when the at least one likelihood score is lesser than a first predetermined threshold. In some aspects, the remedial action module 274 also may issue a second remedial action that prompts the customer device 130 to provide additional authentication information when the at least one likelihood score is greater than the first predetermined threshold and lesser than a second predetermined threshold. In other aspects, the event detection server 150 may grant the customer device 130 with access to the service when each likelihood score in the vector of likelihood scores is greater than the second predetermined threshold.

In some implementations, the remedial action module 274 sends one or more messages to the customer device 130 as a next remedial action to prompt the customer device 130 to supply further authentication information, when an anomaly in the user interaction is detected. In turn, the feedback module 272 of the second pass fraud detection module 280 may receive user feedback in response to the one or more messages. The feedback module 272 may aggregate the feedback and/or post-process the user feedback to a suitable format. The feedback module 272 can provide the user feedback to the non-parametric statistical models in the non-parametric estimation module 283. In some aspects, the user feedback indicates updated authentication information of the customer device 130. In turn, the anomaly detection module 280 may adjust the one or more predetermined thresholds based on the user feedback.

Figure 5:
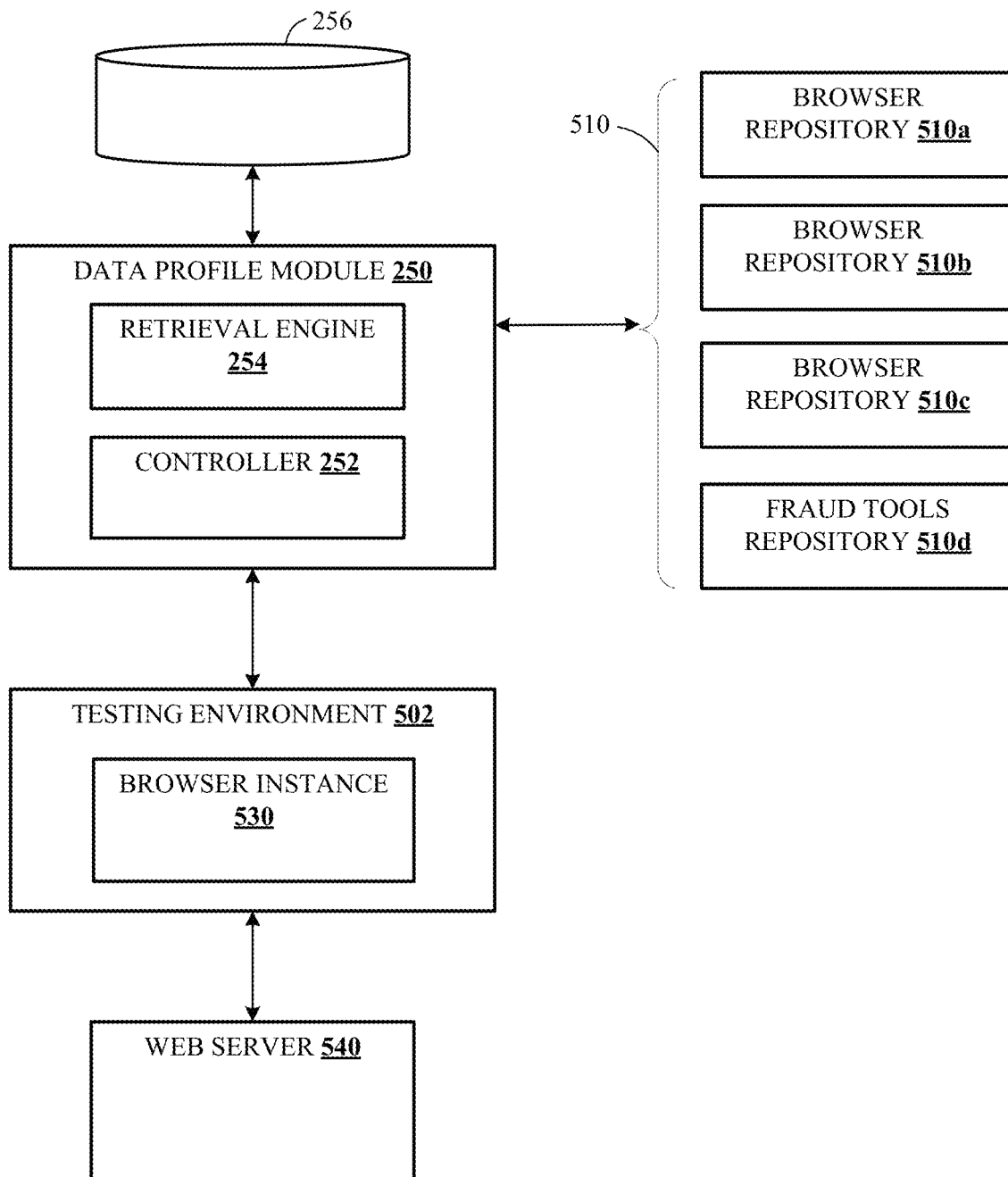
FIG. 5 illustrates a block diagram of a networked system for automated device data retrieval and analysis, according to an implementation of the present disclosure.

FIG. 5 illustrates a block diagram of a data profile module 250 for browser data retrieval and analysis, according to an implementation of the present disclosure. The data profile module 250 represents a novel framework for in-depth and automatic testing of current and pre-release web browser applications with the intent of generating a comprehensive database of their behaviors, features, and functionality in order to provide additional capabilities for detection and mitigation of malicious actors using modified or spoofed client devices. The data profile module 250 may allow baselining for statistical modeling of browser traffic and can generate alert notifications of new functionality that can be implemented into anti-fraud defense mechanisms.

The data profile module 250 includes a retrieval engine 254 that is adapted to fetch device data, such as web browser information from multiple data sources 510. The data sources 510 may include browser repositories 510a-510c storing information associated with different types of browsers (e.g., different manufacturers, different models, different versions which include current and also pre-release versions and models, etc.) and a fraud tool repository 510d storing information associated with known tools used by malicious users for launching attacks on web servers. The data profile module 250, knowledgeable about different vendor's browser release channels and their typical download URLs, regularly fetches new versions. This may be in response to a new release, or may be part of a regular daily process. These may be pre-compiled binary downloads, or the data profile module 250 itself may be able to compile instances of the browser from retrieved source code. Thus, the data profile module 250 may retrieve or otherwise obtain executable code associated with different browser applications (e.g., from different manufacturer, different models, different versions, etc.). For example, the data profile module 250 may obtain a Google Chrome browser version 2.1, a Google Chrome browser version 3.0, an Apple Safari browser version 11.0, an Apple Safari browser version 12.0, a Microsoft Edge browser version 3.2, etc., and store the different browser applications in the data profile repository 256.

Subsequently, the controller 252 of the data profile module 250 can deploy a browser instance 530 (associated with any one of the browser applications stored in the data profile repository 256) in a testing environment 502. In some embodiments, the testing environment 502 may include a virtual machine or a container using virtualization technologies. For example, the controller 252 can deploy the browser instance 530 in a virtual machine. The intent is to have an entirely 'clean' instance of the browser with no customizations or user data that may change its behavior from the pre-set defaults. This automation process to deploy the browser instance 530 can target several different methods, for example: (1) deployment of the browser instance 530 to a new virtual machine, using a fully virtualized environment, (2) deployment of the web browser instance 530 to a segregated container, (3) automation of the web browser instance 530 on a hardware device, for example, using a remote automation process to remotely control the web browser on a device (e.g., a smart phone such as an ANDROID™ phone), and (4) automation of the web browser instance 530 on an emulated device, for example, using the web browser instance 530 (e.g., SAFARI™, etc.) within an emulator.

In some implementations, the browser instance 530 of the fetched web browser is invoked in the testing environment 502. Using a browser automation process, the browser instance 530 can control and run through a series of interactions with a web server 540. For example, the browser instance 530 can interact with the web server 540 via the virtual machine. The controller 252 can inspect the data that the web browser instance 530 sends for anti-fraud purposes, and can run programming code (e.g., JavaScript fingerprinting code, etc.) in an attempt to identify users over time for anti-fraud purposes. Most importantly, the data profile module 250 can detect spoofed web browsers running on the customer device 130 used for abuse and financial fraud based on comparing the device data obtained from the web browsers running on the customer device 130 and the data obtained through the automated analysis process via the interactions between the browser instance 530 and the web server 540 as described herein. These features may include network/communication details, such as: (1) The HTTP headers the browser sends, in a brand new unmodified install, (i) the values that are provided, (ii) the order the headers are sent in, and (iii) the headers that are sent in what conditions; (2) when connecting to a secure site, the TLS ciphers that the web browser supports, and in what preference order they are requested in; and (3) the protocols the web browser supports (e.g., HTTP 1.0, 1.1, QUIC, 2.0, 3.0, etc.) and the supported communication methods (e.g., Websockets, WebRTC, etc.)

The programming code (e.g., the JavaScript fingerprinting code) that is used for fingerprinting can identify device features, such as: (1) the document object model (DOM) processes and attributes the web browser claims to support; (2) the order that the web browser lists these attributes, when requested; (3) an indication of whether the aforementioned processes appear to be "native" values generated by the browser software, or overwritten by the user; (4) the browser-specific processes and attributes it exposes (e.g. FIREFOX™ exposes FIREFOX™-specific CSS attributes with the "-moz-" prefix); (5) how the web browser handles and responds to error conditions, including those deliberately invoked (e.g., when executing JavaScript code to evaluate the mathematical expression "ThisIsNotANumber/0", CHROME™ returns the error message "Uncaught ReferenceError: ThisIsNotANumber is not defined" whereas SAFARI™ returns the error message "ReferenceError: Can't find variable ThisIsNotANumber").

By controlling the browser's actions and having the ability to serve content to it and record its responses and behaviors, the data profile module 250 can thus record both client-side and server-side details. For example, a remote process can be invoked to serve as an automation tooling mechanism to drive the web browser instance 530 through a suite of tests and actions. The browser instance 530 can record the web browser traffic to the web server 540 as well as the return signaling from the web server 540. The web server 540 can record its outgoing web browser traffic to the browser instance 530. The recorded client-side data and server-side data can be stored in a data structure to maintain a database of web browser behavior, attributes, functionality, etc.

There are several use cases that the data profile module 250 can be applicable. For example, the data profile module 250 can be used for alerting of new or forthcoming attributes or behaviors in web browsers. For example, a currently-released version of a particular web browser may expose a particular number of JavaScript DOM attributes (e.g., 100), as determined through the automated deployment process described herein. Through automation, the data profile module 250 can download the latest Beta version and observe that the number of JavaScript DOM attributes exposed by the latest Beta version is different from the current version (e.g., 103 attributes). The data profile module 250 can alert a developer or analyst, giving them the name and location of the additional attribute(s) that is not exposed by the current version, its default value, and how it behaves in certain forced-error conditions. The data profile module 250 may also determine if the additional attribute(s) is useful for anti-fraud purposes, and implement the additional attribute (s) within a fingerprinting mechanism such that when the new version of the particular web browser is released, the data profile module 250 can be updated with new defensive capabilities.

In another use case, the data profile module 250 can be used for alerting of changed or removed attributes or behaviors. Similarly to the first use case, if the data profile module 250 determines that a useful feature used by an anti-fraud system is removed in an upcoming version, or that it now returns a different result or behaves in a different way than previously observed, the data profile module 250 can determine mitigations or alternative approaches (e.g., updating the fraud determination process to reflect the changes) instead of taking a reactive action when data quality suddenly drops or fraud increases.

In another use case, the data profile module 250 baseline the features. The data profile module 250 may perform risk scoring based on technical data that the web browser sends to an online service provider (e.g., service provider server 110). For example, the technical data may indicate that the web browser supports a specified number of encryption ciphers and indicates a prioritized order for the ciphers. This type of information may be part of the browser's internal operations and is not typically modifiable by the user. The data profile module 250 can over time observe typical patterns of data associated with a particular browser version. The data profile module 250 can determine "known good" baseline profiles that can be used to accelerate this learning process. This known good data can then be sent to an analyst (e.g., to the agent device 120) for implementation in a rule or model, can be fed automatically into a model for use in training, or can be fed into a live risk assessment for immediate use.

In still another use case, the data profile module 250 can be used for analyzing criminal fraud and/or abuse tools. For example, malicious attackers may invoke anti-detect processes to submit spoofed browser data when interacting with the online service provider. The spoofed browser data is used to hide the fact that these malicious attackers are using such a tool, instead pretending to be a normal web browser. In other examples, the malicious attackers may spoof certain attributes in an attempt to appear like a particular customer who they know uses a certain browser profile. It is common for these types of tools to be built on top of existing web browser processes with additional modifications made. The data profile module 250 may load copies of criminal fraud tools and profile them in depth, comparing results to a legitimate version of the web browser application in order to determine the exact changes made by the malicious attacker, which can then be used to implement anti-fraud defenses against the tool.

In yet another use case, the data profile module 250 can be used for detection of mismatching features. The data profile module 250 may detect valid but mismatching feature sets compared to the claimed agent device. For example, a client (e.g., the customer device 130) that claims to run a non-desktop version of a select web browser but has the feature set and attributes of a desktop version of another select web browser. The data profile module 250 may determine that the client is involved in malicious activities with the service provider server 110 when such a mis-match is detected.

In still yet another use case, the data profile module 250 can send precisely targeted anti-fraud challenges to suspect devices. For example, existing anti-fraud defenses may examine particular DOM values or execute particular code statements in an attempt to fingerprint the client device. These defenses are commonly designed to work on as many device types and browser versions as possible, to ensure effective collection from the widest possible audience. With granular visibility into all browser versions, the data profile module 250 may deploy highly-targeted fingerprinting code. For example, if the data profile module 250 can determine that a particular version of FIREFOX™ has one hundred unique attributes, the data profile module 250 may prompt each client for three different attributes (out of the one hundred unique attributes), thus yielding over 20 million potential combinations of tests. This can significantly increase the complexity for an adversary to gain a complete understanding of the tests that the data profile module 250 can run.

Figure 6:
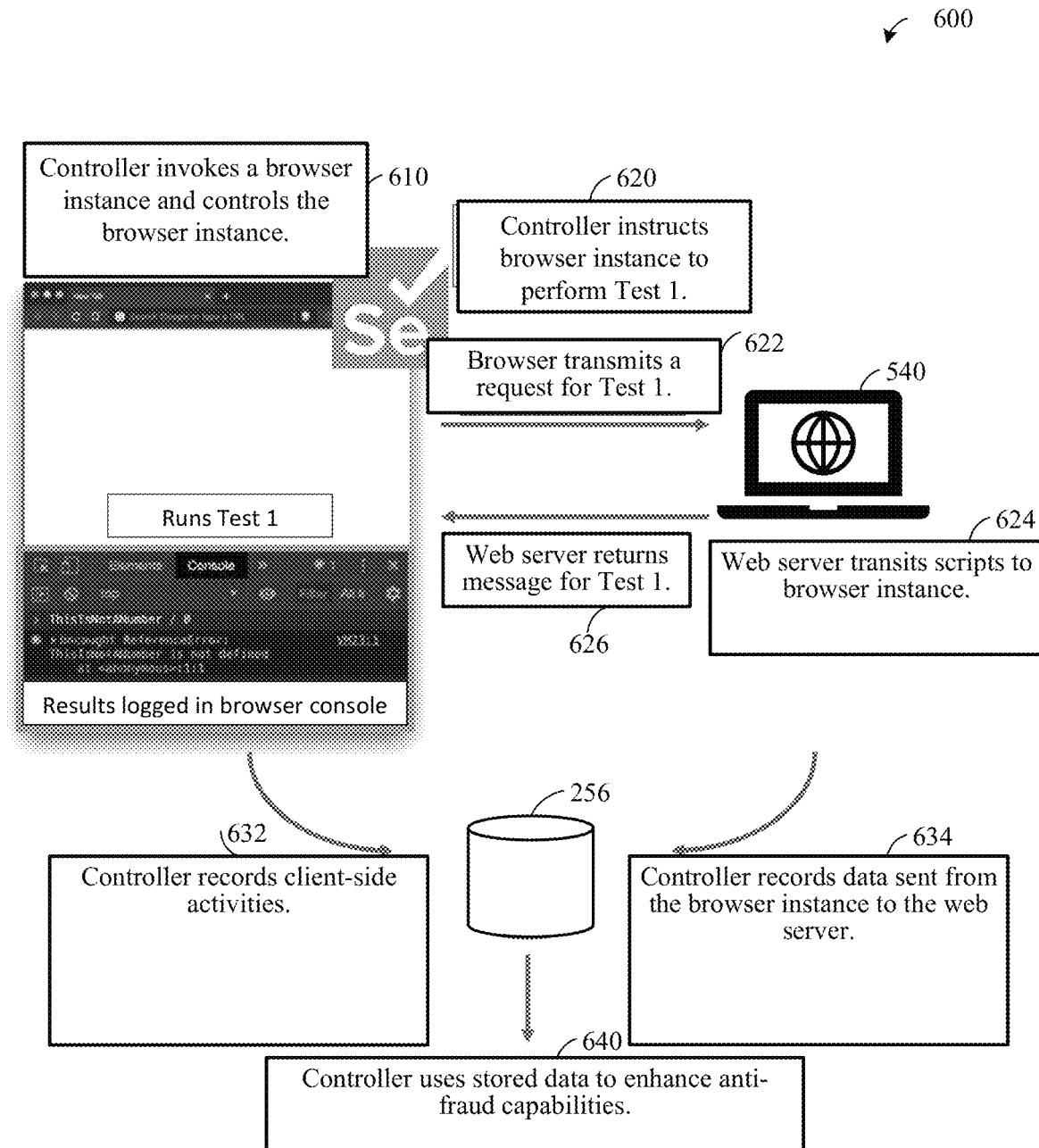
FIG. 6 conceptually illustrates an exemplary workflow of the automated device data retrieval and analysis of FIG. 5, according to an implementation of the present disclosure.

FIG. 6 conceptually illustrates an exemplary workflow 600 of the automated device data retrieval and analysis of FIG. 5, according to an implementation of the present disclosure. For purposes of brevity and efficient explanation of the functional aspects associated with the components described in FIG. 6, the block diagram of FIG. 6 will be described in reference to the processes of FIG. 7.

Figure 7:
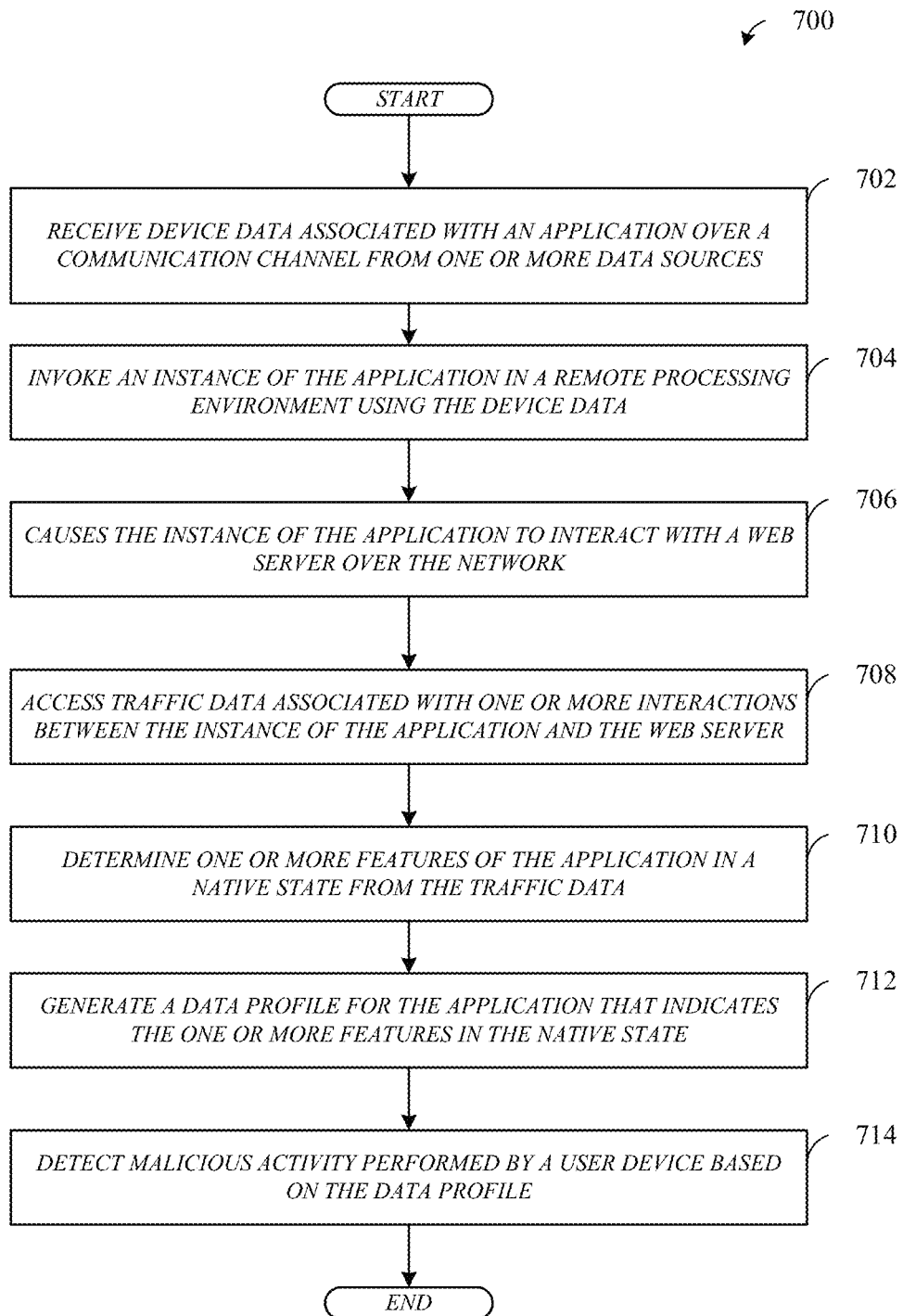
FIG. 7 is a flowchart of an example process of automated device data retrieval and analysis, according to an implementation of the present disclosure.

FIG. 7 is a flowchart of an example process 700 of automated device data retrieval and analysis, according to an implementation of the present disclosure. One or more of the steps 702-714 of process 700 may be implemented, at least in part, in the form of executable code stored on non-transitory, tangible, machine-readable media that when run by one or more processors may cause the one or more processors to perform one or more of the steps 702-714. Some examples of computing devices, such as computer system 1100 may include non-transitory, tangible, machine readable media that include executable code that when run by one or more processors (e.g., processor 1112) may cause the one or more processors to perform the steps of process 700. As illustrated, the process 700 includes a number of enumerated steps, but aspects of the process 700 may include additional steps before, after, and in between the enumerated steps. In some aspects, one or more of the enumerated steps may be omitted or performed in a different order.

The process 700 begins at step 702, where the retrieval engine 254 of the data profile module 250 receives, over the network 140, device data associated with an application over a communication channel from one or more data sources. In some aspects, the retrieval engine 254 may receive device data associated with multiple applications (e.g., different manufacturers, different models, different versions, etc.) from the one or more data sources. For example, the retrieval engine 254 can receive first device data that corresponds to a first version of different versions for the at least one application, for example, from one of the browser repositories 510a-c. In other aspects, the retrieval engine 254 can receive the first device data and second device data that corresponds to a second version of the different versions that at least in part different from the first version, for example, from another one of the browser repositories 510a-c. In various implementations, the retrieval engine 254 is communicably coupled to the API 202.

Next, at step 704, the controller 252 of the data profile module 250 invokes an instance (e.g., the browser instance 530) of the application in a remote processing environment (e.g., the testing environment 502) using the device data. The remote processing environment is remote to the customer device 130. For example, at action 610, the instance of a web browser is invoked and controlled by an automation process executable in the remote processing environment. In some aspects of invoking the instance of the at least one application in the remote processing environment, the controller 252 deploys the at least one application to a virtual machine of different virtual machines using a virtualized environment. In other aspects of invoking the instance of the at least one application in the remote processing environment, the controller 252 deploys the at least one application to a segregated container accessible to the controller of the service provider server 110. In still other aspects of invoking the instance of the at least one application in the remote processing environment, the controller 252 establishes a connection with the instance of the at least one application executed on a remote communication device. In this respect, the controller 252 can establish remote control of the instance of the at least one application through the connection to the remote communication device. In yet other aspects of invoking the instance of the at least one application in the remote processing environment, the controller 252 can establish a connection with the instance of the at least one application executed on a remote emulation device. In this respect, the controller 252 can establish remote control of the instance of the at least one application through the connection to the remote emulation device.

Subsequently, at step 706, the controller 252 causes the instance of the application to interact with a web server over the network. For example, the controller 252 can send, to a remote processing environment, a control message that causes the instance of the at least one application to interact with the web server 540 over the network 140. In one or more implementations, the controller 252 sends, to the remote processing environment, a first control message that prompts the instance of the at least one application to send a request to the web server 540 for returning a process script that is executable on the remote processing environment. For example, at action 620, the first control message may include an instruction to the web browser to request "Test 1."

Thereafter, at action 622, the instance of the web browser transmits a request for "Test 1." At action 624, the web server 540 transmits interrogation scripts and web page documents to the web browser in response to the request. For example, at action 626, the web server 540 responds to the request by transmitting a return message containing script code for executing "Test 1."

Next, at step 708, the controller 252 can access traffic data associated with one or more interactions between the instance of the application and the web server. In some aspects, the traffic data indicates a behavior of application data associated with the at least one application based on the one or more interactions with the web server 540. In some aspects of the accessing the traffic data, the controller 252 can acquire first traffic data transmitted from the instance of the at least one application to the web server. In some aspects, the first traffic data includes one or more of (1) behavioral patterns associated with the at least one application in the one or more interactions over a predetermined period of time, (2) multiple attributes of the at least one application that is set for the one or more interactions, or (3) multiple functionality parameters of the at least one application that is activated in the one or more interactions.

In some aspects of accessing the traffic data, the controller 252 executes the process script on the remote processing environment with the instance 530 of the at least one application. The controller 252 can interrogate the at least one application with the executed process script. In some aspects, the interrogating includes the one or more interactions between the instance 530 and the web server 540. The controller 252 can then log results of the interrogating in a data structure of the data profile repository 256. For example, at action 632, the controller 252 can record client-side activity data (e.g., occurring at the browser instance 530), such as DOM attributes and values and/or generated error messages, among others. At action 634, the controller 252 can record data sent from the browser instance 530 to the web server 540, such as supported TLS ciphers, HTTP request headers, among others. In some aspects of interrogating the at least one application with the executed process script, the controller 252 can invoke a predetermined error condition in the one or more interactions. As such, the controller 252 can log a response of the browser instance 530 of the at least one application based on the predetermined error condition.

Subsequently, at step 710, the controller 252 determines one or more features of the application in a native state from the traffic data. As discussed above, the traffic data may indicate the behavior of the application. Thus, the controller 252 may determine the one or more features of the application based on the behavior of the application. In some examples, values in the native state may correspond to default values (or reset values) set for attributes of the at least one application.

Next, at step 712, the controller 252 generates a data profile of the application that indicates the one or more features in the native state. In some aspects of generating the data profile, the controller 252 can generate a data structure that includes application data that corresponds to the first version. In some aspects, the application data indicates one or more of (1) behavioral patterns associated with the first version over a predetermined period of time, (2) multiple attributes of the at least one application that correspond to the first version, or (3) multiple functionality parameters of the at least one application that correspond to the first version. In some aspects of generating the data profile, the controller 252 can generate a first data structure that comprises first application data the corresponds to the first version and a second data structure that comprises second application data that corresponds to the second version. In some aspects, the first data structure and the second data structure are prioritized based on a first weighting associated with the first application data and a second weighting associated with the second application data. In some aspects, the first weighting and the second weighting are based at least in part on respective lifecycles of the first application data and the second application data.

Subsequently, at step 714, malicious activity performed by a user device may be detected based on the data profile. For example, the controller 252 provides the traffic data and the data profile to the data profile repository 256 accessible to one or more remote devices associated with a service. The remote devices may detect malicious activity performed by the customer device 130 by comparing device data associated with the customer device 130 and the data profile. For example, when the customer device 130 indicates that the application that is in communication with the service provider server 110 is of a particular type (e.g., a particular manufacturer, a particular model, a particular version, etc.), the remote device may compare the device data received from the customer device 130 (which may include data associated with interactions between the customer device 130 and the service provider server 110) against the data profile associated with an application of the particular type. When the device data deviates from the data profile by more than a threshold, the remote device may determine that the customer device 130 is used to conduct malicious activity (e.g., account take-over, etc.). In some implementations, the controller 252 generates a notification that indicates the behavior of the application data associated with the at least one application. The controller 252 may provide, through the API 202 over the network 140, the notification to the customer device 130. In various aspects, the controller 252 provides the data profile from the data profile repository 256 to a remote engine associated with the service that performs one or more detection operations with the data profile and detects potential malicious activity associated with the at least one application from the one or more detection operations. For example, at action 640, the stored data can be used to enhance anti-fraud capabilities.

Figure 8:
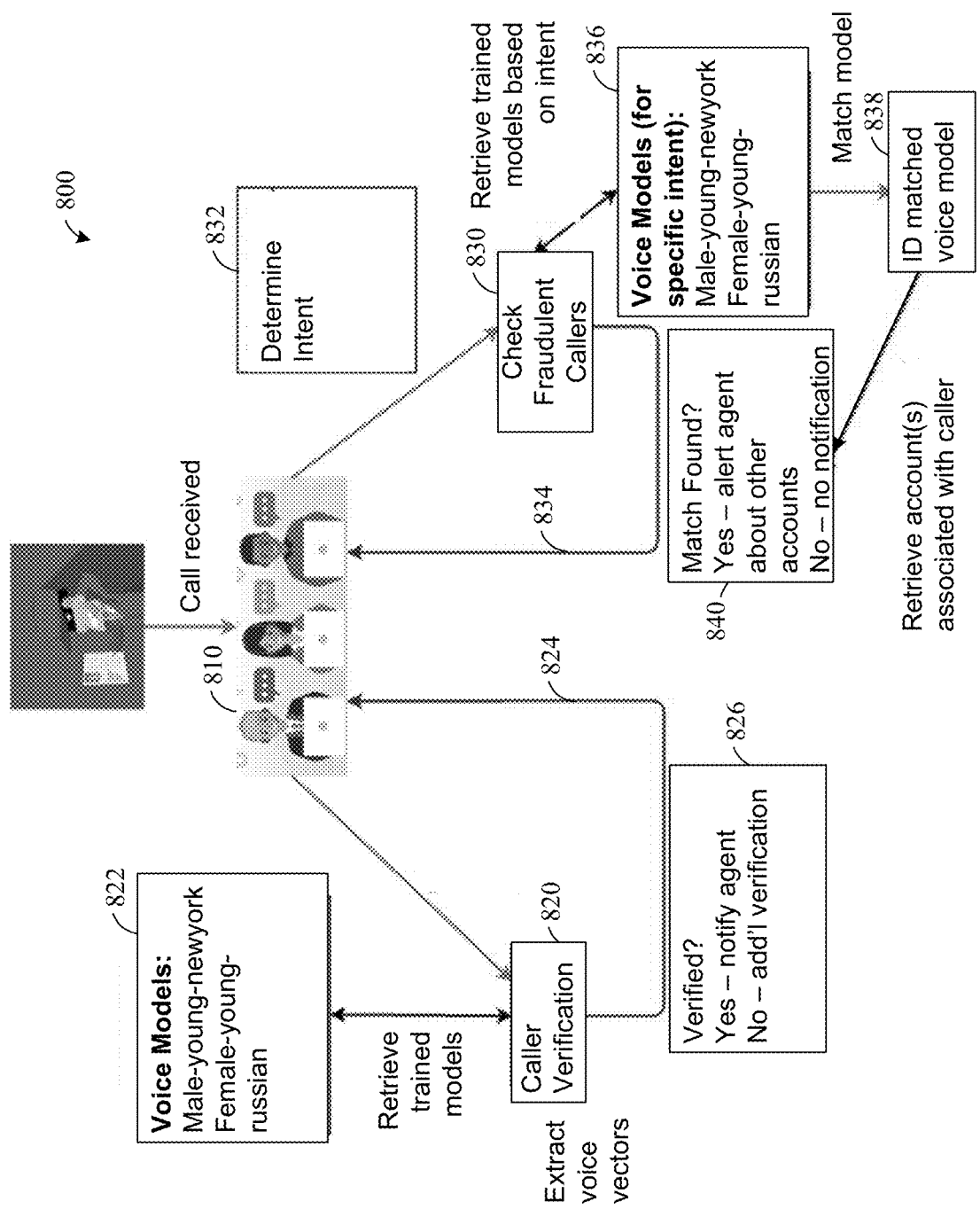
FIG. 8 conceptually illustrates an exemplary workflow of a voice vector framework for authenticating user interactions, according to an implementation of the present disclosure.

FIG. 8 conceptually illustrates an exemplary workflow 800 of a voice vector framework for authenticating user interactions, according to an implementation of the present disclosure. For purposes of brevity and efficient explanation of the functional aspects associated with the components described in FIG. 8, actions of the workflow diagram of FIG. 8 will be described in reference to the processes of FIGS. 9 and 10. In general, FIG. 8 illustrates actions that authenticate a caller who calls the service provider server 110 in association with a user account with the service provider server 110. For example, the caller may be calling to perform a transaction in association with the user account (e.g., resetting a password, performing a payment transaction, etc.). The workflow 800 may include actions for authenticating the caller for accessing the user account (or for performing the transaction for the user account) based on voice data associated with the caller.

In some embodiments, according to the workflow 800, the voice vector framework first authenticates the caller as legitimate customer and then checks if the same caller has called before with similar intentions on multiple accounts. The framework can provide real-time feedback by alerting customer service agents of such suspicious activity. The framework can leverage various aspects of speech recognition and voice identification technology as well as intent identification on the incoming customer call. The framework includes a process of generating a suite of machine learning-based models that encompasses the variations that are representative an entity's customers. The framework provides a two-stage procedure that first verifies the identity of a caller and second to check if the same caller has previously called with the same intention on a different account not belonging to him or her. This framework can identify fraudsters, generate a voice blacklist, and alert customer service agents in real time to mitigate any security lapse.

Figure 9:
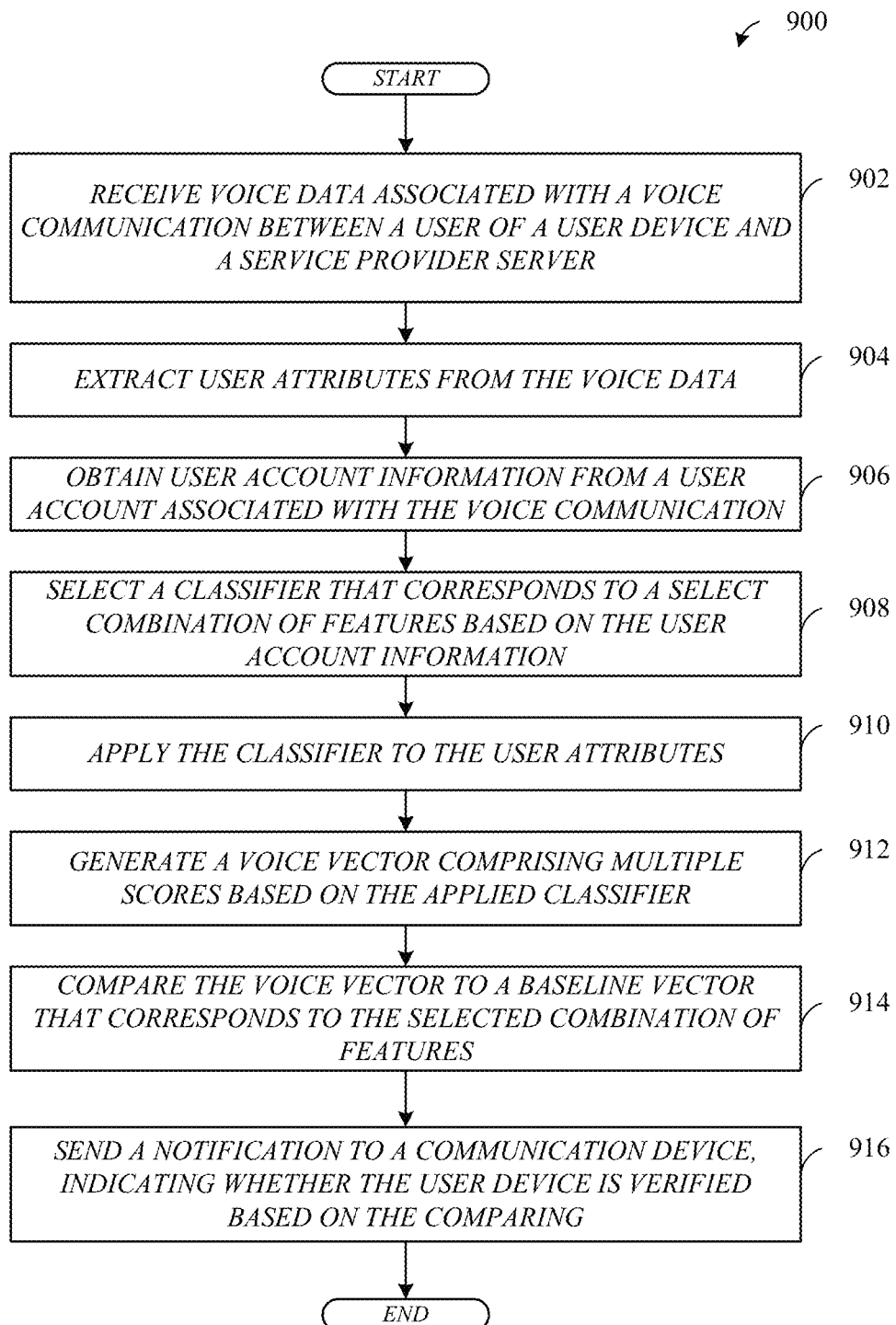
FIG. 9 is a flowchart of an example process of a voice vector framework for verifying user interactions, according to an implementation of the present disclosure.

FIG. 9 is a flowchart of an example process 900 of a voice vector framework for verifying user interactions, according to an implementation of the present disclosure. One or more of the steps 902-916 of process 900 may be implemented, at least in part, in the form of executable code stored on non-transitory, tangible, machine-readable media that when run by one or more processors may cause the one or more processors to perform one or more of the steps 902-916. Some examples of computing devices, such as computer system 1100 may include non-transitory, tangible, machine readable media that include executable code that when run by one or more processors (e.g., processor 1112) may cause the one or more processors to perform the steps of process 900. As illustrated, the process 900 includes a number of enumerated steps, but aspects of the process 900 may include additional steps before, after, and in between the enumerated steps. In some aspects, one or more of the enumerated steps may be omitted or performed in a different order.

The process 900 begins at step 902, where the feature extraction module 210 receives voice data associated with a voice communication between a user of a user device and a service provider server. For example, when a caller uses a device (e.g., the customer device 130) to make a phone call to an agent (e.g., a human agent, a robot, etc.) of the service provider server 110, the voice vector framework, at action 810, may receive the voice data associated with the phone call.

Next, at step 904, the feature extraction module 210 extracts user attributes from the voice data. For example, the feature extraction module 210 can extract words and/or phrases from the voice transcript.

Subsequently, at step 906, the controller 252 obtains user account information from a user account associated with the voice communication. For example, based on the extracted user attributes, the controller 252 may determine that the voice communication is regarding a user account with the service provider server 110 (e.g., disputing a transaction associated with the user account, resetting the user account, etc.).

Next, at step 908, the classification module 230 can select a classifier that corresponds to a select combination of features based on the user account information. For example, at action 822, the classification module 230 can retrieve a trained model based on the account information of the caller generated by the feature extraction module 210. In some examples, the trained model may be a gender-age-accent model. In some aspects of selecting the classifier that corresponds to the predetermined combination of features, the classification module 230 can select a select number of classifiers that correspond to different user attribute combinations based on different attributes in one or more of the user attributes or the user account information.

Subsequently, at step 910, the classification module 230 applies the classifier to the user attributes and/or the voice vectors.

Next, at step 912, the audio feature extraction engine 217, in coordination with the classifier 232, can generate a voice vector comprising multiple scores based on the applied classifier. For example, at action 820, the audio feature extraction engine 217 can generate the voice vector with a representation of words and/or phrases as audio attributes extracted from the audio call. In some aspects, each of the scores in the voice vector indicates a likelihood that an attribute of the different user attributes corresponds to an attribute of the select combination of features. In some aspects of generating the voice vector, the audio feature extraction engine 217 can mask one or more of the scores based at least in part on one or more attributes in the user account information. In this regard, the audio feature extraction engine 217, in coordination with the classifier 232, can generate the voice vector with the masked one or more of the scores. In some aspects, the masked one or more of the scores are excluded from the comparing operation in step 914. In other aspects of generating the voice vector, the audio feature extraction engine 217 can apply a weighting to one or more of the scores based at least in part on one or more attributes in the user account information. In this regard, the audio feature extraction engine 217, in coordination with the classifier 232, can generate the voice vector with the weighting applied to the one or more of the scores.

Subsequently, at step 914, the voice scoring module 234 may compare the voice vector to a baseline vector that corresponds to a predetermined combination of features (e.g., the selected combination of features). In some aspects of comparing the voice vector to the baseline vector, the voice scoring module 234 can determine a distance between one or more of the scores in the voice vector and corresponding values in the baseline vector. In this respect, the voice scoring module 234 can determine whether the distance between each of the one or more of the scores and the corresponding values exceeds a predetermined distance threshold. In some aspects of comparing the voice vector to the baseline vector, the voice scoring module 234 can determine whether a difference between the voice vector and the baseline vector is within a predetermined tolerance threshold. In this regard, the voice scoring module 234 can determine that the user device is verified based on the difference between the voice vector and the baseline vector is determined to be within the predetermined tolerance threshold. In other aspects of comparing the voice vector to the baseline vector, the voice scoring module 234 can obtain multiple voice vectors from user account information associated with respective ones of multiple different user accounts, and the voice scoring module 234 can compare the voice vector to each of the voice vectors.

Next, at step 916, the report generation module 260 may send a notification to the agent device 120 associated with the service provider server 110. For example, at action 824, the report generation module 260 can provide an indication of the caller verification to the agent device 120. In some aspects, the notification includes an indication of whether the user device is verified based on the comparing. In some aspects, the report generation module 260 generates the notification with the indication that indicates that the user device is verified when the voice scoring module 234 determines that the distance between each of the one or more of the scores and the corresponding values does not exceed the predetermined distance threshold. In other aspects, the report generation module 260 generates the notification with the indication that indicates that the user device is not verified when the voice scoring module 234 determines that the distance between the one or more of the scores and the corresponding values exceeds the predetermined distance threshold. In this regard, the notification prompts the agent device 120 to send one or more queries to the customer device 130 for additional verification information. For example, at action 826, if the caller is verified, notification can be sent to the agent device 120. Otherwise, an alert is generated and sent to the agent device 120 for additional verification.

Figure 10:
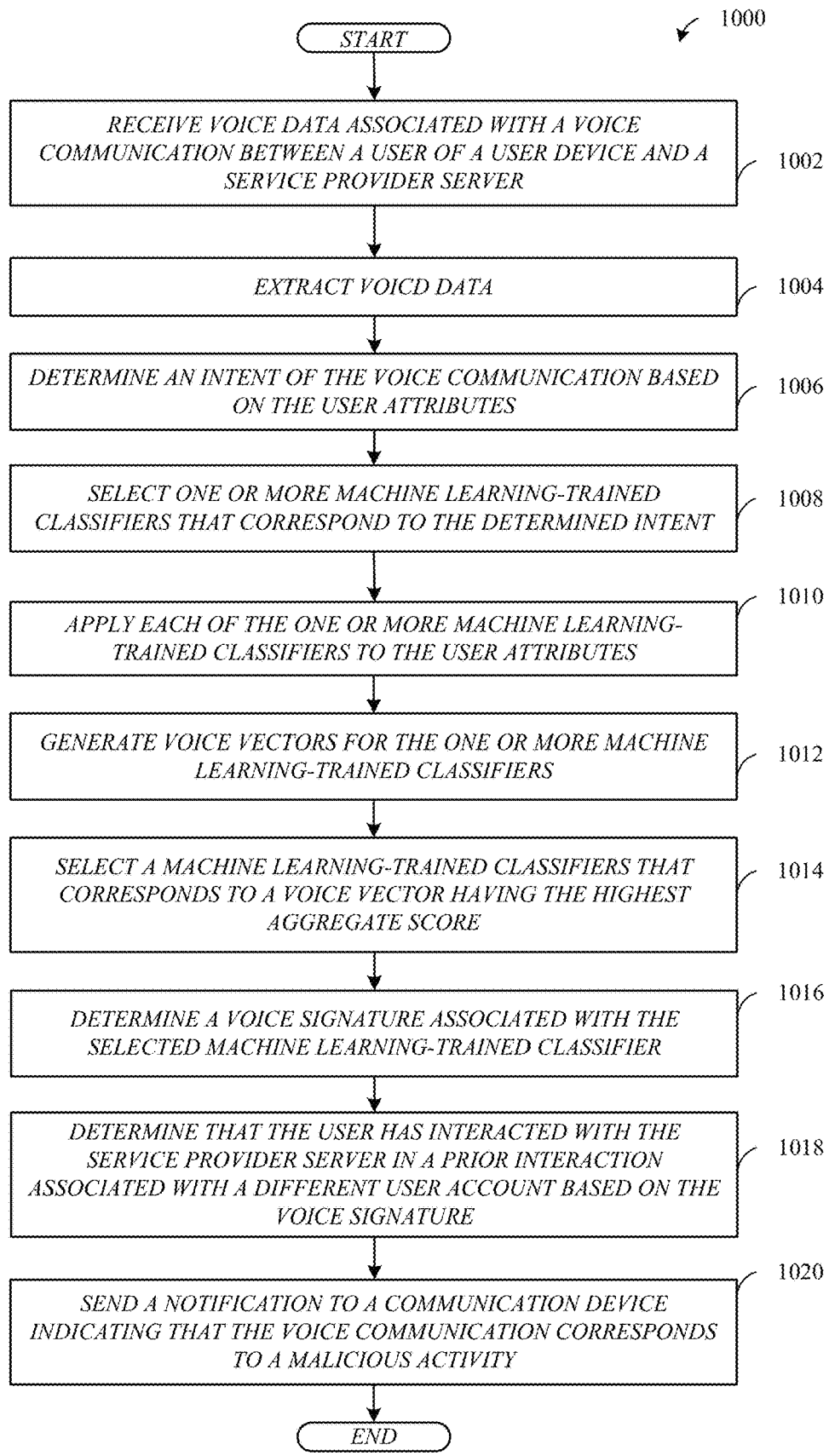
FIG. 10 is a flowchart of an example process of a voice vector framework for detecting malicious activity in user interactions, according to an implementation of the present disclosure.

FIG. 10 is a flowchart of an example process 1000 of a voice vector framework for detecting malicious activity in user interactions, according to an implementation of the present disclosure. One or more of the steps 1002-1020 of process 1000 may be implemented, at least in part, in the form of executable code stored on non-transitory, tangible, machine-readable media that when run by one or more processors may cause the one or more processors to perform one or more of the steps 1002-1020. Some examples of computing devices, such as computer system 1100 may include non-transitory, tangible, machine readable media that include executable code that when run by one or more processors (e.g., processor 1112) may cause the one or more processors to perform the steps of process 1000. As illustrated, the process 1000 includes a number of enumerated steps, but aspects of the process 1000 may include additional steps before, after, and in between the enumerated steps. In some aspects, one or more of the enumerated steps may be omitted or performed in a different order.

The process 1000 begins at step 1002, where the feature extraction module 210 receives voice data associated with a voice communication between a user of a user device and a service provider server. For example, the voice communication may be from a phone call from a user of the customer device 130 and an agent (e.g., a human agent, a robot) associated with the service provider server 110. The phone call may be regarding a user account (e.g., disputing a transaction associated with the user account, resetting a password for the user account, etc.).

Next, at step 1004, the feature extraction module 210 can extract user attributes from the voice data. For example, at action 810, the feature extraction module 210 can extract words and/or phrases from the voice transcript.

Subsequently, at step 1006, the classification module 230 determines an intent of the voice communication based on the user attributes. For example, at action 832, the classification module 230 may determine that the intent of the voice call is a request to reset a password for a user account. Other example intents may include account verification, lift restriction from a user account, among others.

Next, at step 1008, the classification module 230 may select one or more of several machine learning-trained classifiers that correspond to the determined intent. As discussed, various voice models corresponding to different intents have been trained using historic voice data associated with one or more user accounts. After a call has been classified as one of the different intents, the voice data associated with the call may be used to train the voice model corresponding to the classified intent. At action 836, the classification module 230 retrieves trained models based on the intent. (inventors: can you elaborate on how the In some implementations, the classification module 230 may obtain user account information from a user account associated with the customer device 130, and the classification module 230 selects a machine learning-trained classifier that corresponds to a select combination of features based on the user account information.

Next, at step 1010, the classifier 232 applies each of the one or more machine learning-trained classifiers to the user attributes. In some aspects, the classifier 232 applies a selected machine learning-trained classifier to the different user attributes.

Subsequently, at step 1012, the audio feature extraction engine 217, in coordination with the classifier 232, generates voice vectors for the one or more machine learning-trained classifiers. For example, the audio feature extraction engine 217 may generate the voice vectors based on a baseline voice vector associated with each of the one or more of the machine learning-trained classifiers. In some aspects, the audio feature extraction engine 217, in coordination with the classifier 232, generates a voice vector that includes scores based on the applied machine learning-trained classifier. In some aspects, each of the scores in the voice vector indicates a likelihood that an attribute of the different user attributes corresponds to an attribute of a predetermined combination of features.

Next, at step 1014, the classifier 232 can select a machine learning-trained classifier that corresponds to a voice vector having the highest aggregate score. For example, the classifier 232 may compare the scores associated with the different voice vectors of the different machine learning-trained classifiers. The score may represent a similarity between the voice vector and the user attributes extracted from the voice data of the voice communication. Thus, the higher the score, the more similar the voice in the voice communication is to the voice vector. For example, at action 838, the classifier 232 identifies which voice the caller matches in identifying a matched model.

Subsequently, at step 1016, the fraud class module 233, in coordination with the voice scoring module 234, may determine a voice signature associated with the selected one of the machine learning-trained classifiers.

Next, at step 1018, the fraud class module 233 can determine whether the customer device 130 interacted with the service provider server 110 in a prior interaction associated with a different user account based on the voice signature. For example, at action 840, the fraud class module 233 can retrieve account information for which the same caller called for review in a prior occasion. If a match is found, the fraud class module 233, in coordination with the report generation module 260, can alert an agent associated with the agent device 120, indicating that the current caller called previously for a different user account. Otherwise, the fraud class module 233 may not generate nor send a notification to the agent device 120. In some aspects of determining whether the customer device 130 interacted with the service provider server 110, the fraud class module 233 can access user account information in a data repository communicably coupled to the service provider server 110 and compare the voice signature to a historical voice signature associated with the accessed user account information that is stored in a data structure of the data repository. The fraud class module 233 can determine that a distance between the voice signature and the historical voice signature is within a predetermined tolerance threshold. In this regard, the fraud class module 233 determines that the customer device 130 interacted with the service provider server 110 in the prior interaction. In some aspects of comparing the voice signature to the historical voice signature, the fraud class module 233 can obtain different historical voice signatures from user account information associated with respective ones of different user accounts, and the fraud class module 233 compares the voice signature to each of the historical voice signatures.

Subsequently, at step 1020, the report generation module 260 can send a notification to a communication device associated with the service provider server 110 (e.g., the agent device 120). In some aspects, the notification may include an indication of whether the user device interacted with the service provider server in the prior interaction. For example, at action 834, the report generation module 260 sends notification of detected fraudulent callers to the agent device 120.

Figure 11:
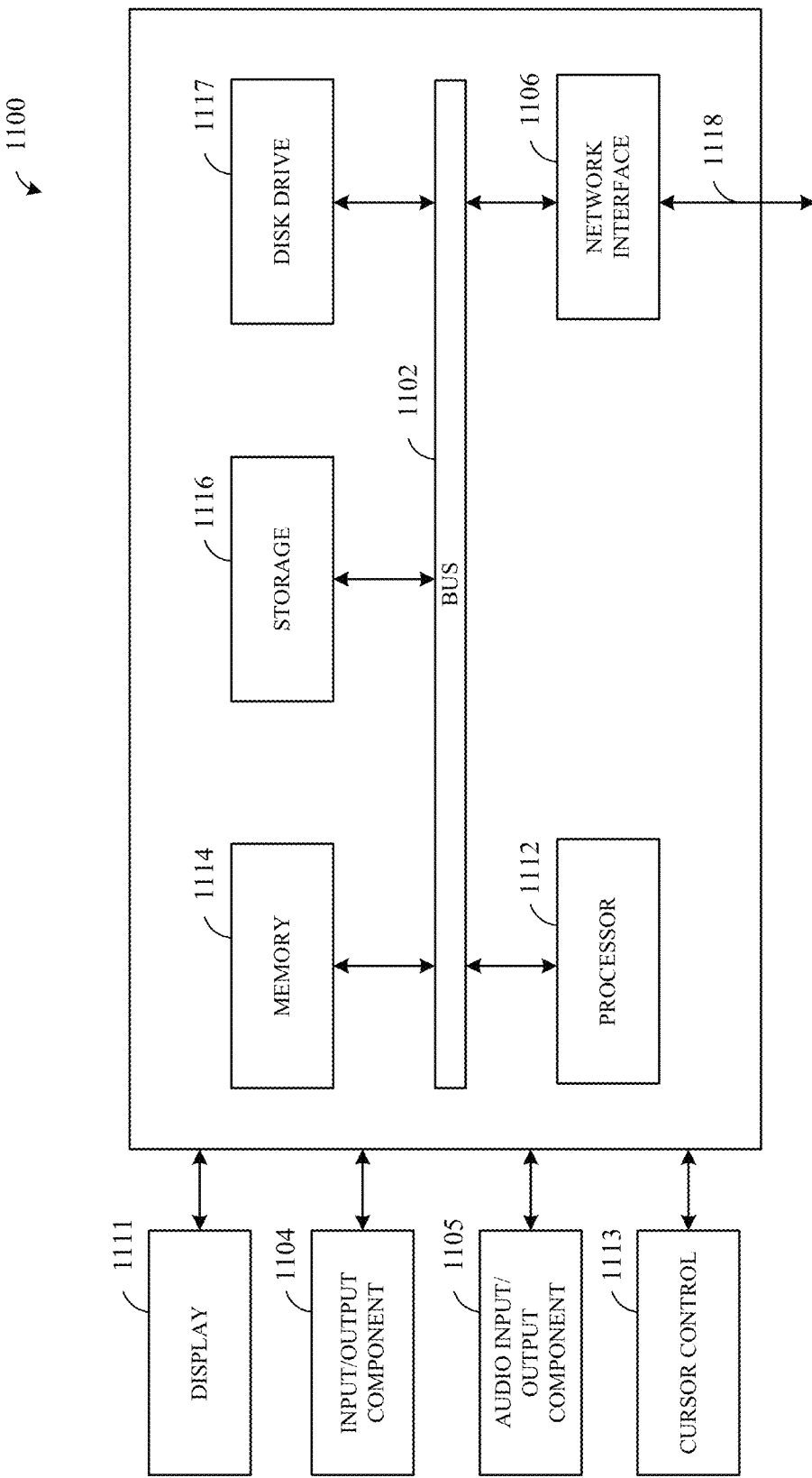
FIG. 11 is a block diagram of a computer system suitable for implementing one or more components in FIG. 1 and FIG. 2, according to an implementation.

FIG. 11 is a block diagram of a computer system suitable for implementing one or more components in FIGS. 1 and 2, according to an implementation. In various implementations, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 1100 in a manner as follows.

Computer system 1100 includes a bus 1102 or other communication mechanism for communicating information data, signals, and information between various components of computer system 1100. Components include an input/output (I/O) component 1104 that processes a user action, such as selecting keys from a keypad/keyboard, selecting one or more buttons, image, or links, and/or moving one or more images, etc., and sends a corresponding signal to bus 1102. I/O component 1104 may also include an output component, such as a display 1111 and a cursor control 1113 (such as a keyboard, keypad, mouse, etc.). An optional audio input/output component 1105 may also be included to allow a user to use voice for inputting information by converting audio signals. Audio I/O component 1105 may allow the user to hear audio. A transceiver or network interface 1106 transmits and receives signals between computer system 1100 and other devices, such as another communication device, service device, or a service provider server via network 140. In one implementation, the transmission is wireless, although other transmission mediums and methods may also be suitable. One or more processors 1112, which can be a micro-controller, digital signal processor (DSP), or other processing component, processes these various signals, such as for display on computer system 1100 or transmission to other devices via a communication link 1118. Processor(s) 1112 may also control transmission of information, such as cookies or IP addresses, to other devices.

Components of computer system 1100 also include a system memory component 1114 (e.g., RAM), a static storage component 1116 (e.g., ROM), and/or a disk drive 1117. Computer system 1100 performs specific operations by processor(s) 1112 and other components by executing one or more sequences of instructions contained in system memory component 1114. Logic may be encoded in a computer readable medium, which may refer to any medium that participates in providing instructions to processor(s) 1112 for execution. Such a medium may take many forms, including but not limited to, non-volatile media, volatile media, and transmission media. In various implementations, non-volatile media includes optical or magnetic disks, volatile media includes dynamic memory, such as system memory component 1114, and transmission media includes coaxial cables, copper wire, and fiber optics, including wires that comprise bus 1102. In one implementation, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 1100. In various other implementations of the present disclosure, a plurality of computer systems 1100 coupled by communication link 1118 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

The foregoing disclosure is not intended to limit the present disclosure to the precise forms or particular fields of use disclosed. As such, it is contemplated that various alternate implementations and/or modifications to the present disclosure, whether explicitly described or implied herein, are possible in light of the disclosure. Having thus described implementations of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and
   one or more hardware processors coupled with the non-transitory memory and configured to read instructions from the non-transitory memory to cause the system to perform operations comprising:
   detecting a session between a user device and a service provider server, wherein a webpage associated with the service provider server is rendered on the user device during the session, and wherein the user device is authenticated through a first authentication process for the session;
   transmitting programming code to the user device via the session, wherein the transmitting causes the user device, upon executing the programming code based on a rendering of the webpage on the user device, to retrieve device data corresponding to a plurality of device attributes and associated with the user device;
   determining, from the plurality of device attributes, a plurality of device attribute combinations;
   selecting, from a plurality of machine learning models configured to analyze different subsets of the plurality of device attributes, one or more machine learning models for the session based on the plurality of device attribute combinations;
   providing different portions of the device data to the one or more machine learning models;
   generating, using outputs from the one or more machine learning models, a vector of likelihood scores for the plurality of device attribute combinations;
   determining, from the plurality of device attribute combinations, at least one device attribute combination that does not satisfy one or more thresholds based on the generated vector of likelihood scores;
   detecting an anomaly in the session based on the determining that the at least one device attribute combination does not satisfy the one or more thresholds; and
   in response to detecting the anomaly, performing a second authentication process for further authenticating the user device for the session.

2. The system of claim 1, wherein the operations further comprise denying the user device access to a service of the service provider server based on a result associated with the second authentication process.

3. The system of claim 1, wherein the performing the second authentication process comprises prompting, via the user device, a user of the user device to provide additional authentication information.

4. The system of claim 1, wherein the operations further comprise:
   granting the user device access to a service of the service provider server when the user device is authenticated through the second authentication process.

5. The system of claim 1, wherein the transmitting further causes the user device to send the device data to the system, and wherein the device data indicates a device type of the user device.

6. The system of claim 1, wherein the operations further comprise:
   receiving a first plurality of logs indicating a first plurality of events associated with a plurality of devices that occur in a first window of time, wherein each event of the first plurality of events comprises first device data corresponding to a device in the plurality of devices; and
   receiving a second plurality of logs indicating a second plurality of events associated with the plurality of devices that occur in a second window of time different from the first window of time, wherein each event of the second plurality of events comprises second device data corresponding to a device in the plurality of user devices.

7. The system of claim 1, wherein the operations further comprise:
   generating a first plurality of machine learning models associated with a plurality of first thresholds based on a first plurality of events associated with a first window of time; and
   generating a second plurality of machine learning models associated with a plurality of second thresholds based on a second plurality of events associated with a second window of time,
   wherein at least one of the plurality of first thresholds is different from at least one of the plurality of second thresholds.

8. The system of claim 1, wherein the operations further comprise:
   receiving updated authentication data from the user device during the second authentication process;
   providing the updated authentication data to the plurality of machine learning models; and
   adjusting the one or more thresholds based on the updated authentication data.

9. The system of claim 1, wherein the plurality of device attributes comprises at least one of a display resolution of the user device, a model name of the user device, a computer software version of a software executing on the user device, a list of plug-ins installed on the user device, a font type used on the user device, a language used in the user device, or a display size of the user device.

10. The system of claim 1, wherein the operations further comprise:
    receiving, from the user device, a plurality of user queries via the session, wherein each of the plurality of user queries comprises a user interaction related to a user account with the service provider server; and
    extracting, from the plurality of user queries, second device data of the user device.

11. The system of claim 1, wherein the operations further comprise:
    training the plurality of machine learning models with a training dataset that comprises a plurality of user interactions captured within one or more windows of time and a mapping to a plurality of predetermined probability density function distributions.

12. A method, comprising:
    detecting, by one or more hardware processors, an interaction between a user of a user device and a webpage presented on the user device during a web session between the user device and a service provider server;
    transmitting, by the one or more hardware processors, computer instructions to the user device, wherein the transmitting causes the user device, upon executing the computer instructions based on a presentation of the webpage on the user device, to retrieve device data representing a plurality of features associated with the user device;

determining, by the one or more hardware processors and from the plurality of features, a plurality of feature combinations;

selecting, by the one or more hardware processors and from a plurality of machine learning models configured to analyze different subsets of the plurality of features, one or more machine learning models for the web session based on the plurality of feature combinations;

providing, by the one or more hardware processors, different portions of the device data to the one or more machine learning models;

determining, by the one or more hardware processors and based on an output from at least one of the one or more machine learning models, that a particular feature combination from the plurality of feature combinations has a variance of expected values exceeding a threshold variance;

generating, by the one or more hardware processors, a prediction indicating a likelihood that the interaction is associated with a fraudulent activity based on the determining that the particular feature combination has the variance of expected values exceeding the threshold variance; and restricting, by the one or more hardware processors, the user device from accessing one or more services of the service provider server during the web session based on the prediction.

13. The method of claim 12, further comprising:
generating a histogram for each of the plurality of feature combinations based on the device data; and
estimating a probability density function distribution based on the histogram for each of the plurality of features combinations, wherein the histogram for each of the plurality of feature combinations comprises a two-dimensional relationship between first attribute values of a first feature against second attribute values of a second feature in a corresponding feature combination.

14. The method of claim 13, wherein the histogram indicates a plurality of relationships among one or more features in a multi-dimensional space for the corresponding feature combination.

15. A non-transitory machine-readable medium having stored thereon machine-readable instructions executable to cause a machine to perform operations comprising:
detecting an interaction between a user of a user device and a webpage displayed on the user device during a web session between the user device and a service provider server associated with a service;
transmitting computer code to the user device, wherein the transmitting causes the user device, upon executing the computer code based on a display of the webpage on the user device, to retrieve device data representing a plurality of device attributes associated with the user device;
determining, from the plurality of device attributes, a plurality of device attribute combinations;
selecting, from a plurality of machine learning models configured to analyze different subsets of the plurality of device attributes, one or more machine learning models for the web session based on the plurality of device attribute combinations;
providing different portions of the device data to the one or more machine learning models;
determining, based on an output from at least one of the one or more machine learning models that a particular device attribute combination from the plurality of device attribute combinations has a variance of expected values that exceeds a threshold variance;
generating a prediction indicating a likelihood that the interaction corresponds to a fraudulent activity based on the determining that the articular device attribute combination has the variance of expected values that exceeds the threshold variance; and
issuing, for the web session, a remedial action to the user device through an application programming interface based on the prediction.

16. The non-transitory machine-readable medium of claim 15, wherein the operations further comprise:
generating, for the plurality of device attributes, a probability density distribution using a probability density function algorithm, wherein the probability density distribution comprises a two-dimensional relationship between a plurality of likelihood values against different device attribute values for a given device attribute combination of a plurality of device attribute combinations.

17. The non-transitory machine-readable medium of claim 16, wherein the operations further comprise, for each device attribute combination in the plurality of device attribute combinations, generating a likelihood metric indicating that a corresponding attribute value associated with the interaction is an actual occurrence.

18. The non-transitory machine-readable medium of claim 15, wherein the operations further comprise:
obtaining a user profile that indicates a user behavior associated with the user device; and
determining a likelihood metric indicating that a corresponding attribute value associated with the interaction is an actual occurrence based on the user profile.

19. The non-transitory machine-readable medium of claim 15, wherein the operations further comprise:
generating likelihood scores for a plurality of device attribute combinations based on the plurality of device attributes;
determining one or more clusters of likelihood scores based on applying a clustering algorithm to the likelihood scores; and
detecting a data point corresponding to at least one likelihood score being of the one or more clusters by a threshold distance, wherein the data point corresponds to the anomaly in the user interaction.

20. The non-transitory machine-readable medium of claim 15, wherein the operations further comprise:
generating likelihood scores for a plurality of device attribute combinations based on the plurality of device attributes; and
applying a singular value decomposition algorithm to the likelihood scores to determine one or more principle components in the likelihood scores, wherein each of the one or more principle components identifies which of the plurality of device attributes has a highest variance.

* * * * *